United States Patent
Lukes et al.

(10) Patent No.: US 6,179,548 B1
(45) Date of Patent: Jan. 30, 2001

(54) FOLDED CARTON STACKING AND PACKING APPARATUS

(75) Inventors: Matthew Robert Lukes, Cincinnati; Norman Philip Crowe, Milford, both of OH (US)

(73) Assignee: Multifold International, Inc., Milford, OH (US)

(*) Notice: Under 35 U.S.C. 154(b), the term of this patent shall be extended for 0 days.

(21) Appl. No.: 08/982,100

(22) Filed: Dec. 1, 1997

Related U.S. Application Data

(63) Continuation of application No. 08/915,826, filed on Aug. 21, 1997.

(51) Int. Cl.[7] .................................................. B65G 61/00
(52) U.S. Cl. .................. 414/791; 414/792.2; 414/788.6; 414/790; 414/788.3; 414/790.6
(58) Field of Search ................. 414/791, 792.2, 414/788.5, 778.6, 790, 788.3, 788.9, 789.9, 790.4, 790.5, 790.6; 53/446, 447, 540

(56) References Cited

U.S. PATENT DOCUMENTS

| | | |
|---|---|---|
| 1,287,088 | 12/1918 | Paridon . |
| 3,820,302 | 6/1974 | Doran et al. . |
| 3,895,566 | 7/1975 | Anikanov et al. . |
| 3,970,202 | 7/1976 | Speggiorin et al. . |
| 4,068,567 * | 1/1978 | Allison et al. ............... 414/791 |
| 4,103,785 * | 8/1978 | Wiseman ...................... 414/792.2 |
| 4,124,128 | 11/1978 | Adams et al. . |
| 4,183,704 * | 1/1980 | Steinhart ...................... 414/792.2 |
| 4,264,255 | 4/1981 | Saro et al. . |
| 4,307,800 | 12/1981 | Joa . |
| 4,384,813 | 5/1983 | Smith et al. . |
| 4,547,112 * | 10/1985 | Steinhart ...................... 414/792.2 |
| 4,657,465 | 4/1987 | Aoki . |
| 4,784,558 * | 11/1988 | Toriyama .................... 414/791 |
| 4,838,747 | 6/1989 | Morisod . |
| 4,870,807 * | 10/1989 | Palamides .................. 53/540 |
| 5,078,260 | 1/1992 | Bensberg et al. . |
| 5,081,818 | 1/1992 | Poloni . |
| 5,174,089 | 12/1992 | Poloni . |
| 5,291,720 | 3/1994 | Lashyro et al. . |
| 5,353,576 | 10/1994 | Palamides et al. . |
| 5,387,077 * | 2/1995 | Yatsuka et al. ............ 414/791 |
| 5,426,921 * | 6/1995 | Beckman ................... 53/540 |
| 5,588,281 * | 12/1996 | Boriani et al. ............. 53/443 |
| 5,765,337 * | 6/1998 | Lodewegen et al. ....... 53/447 |
| 5,842,327 * | 12/1998 | Schwede .................... 53/540 |

FOREIGN PATENT DOCUMENTS

| | | |
|---|---|---|
| 4217178-A1 | 11/1993 | (DE) . |
| WO 92/12053 | 7/1992 | (IT) . |

OTHER PUBLICATIONS

Drawing D 9400000 considered the date of this as Dec. 1, 1997.
Drawing 94000002 considered the date of this as Dec. 1, 1997.

* cited by examiner

Primary Examiner—Douglas Hess
(74) Attorney, Agent, or Firm—Killworth, Gottman, Hagan & Schaeff, LLP

(57) ABSTRACT

Apparatus is provided for receiving folded cartons of non-uniform thickness from a conventional gluing device, stacking those cartons into stacks of a predefined number, and rotating successive stacks 180° from each other in order to compensate for the uneven or non-uniform thickness of each folded carton. The apparatus further serves to drop two or more stacks of the folded cartons from a stack building station into a slug building area and then, once a slug of a desired size is built, tilting the slug until the plane of each folded carton is vertically oriented (i.e., the slug lies horizontally). The apparatus then automatically loads the slug into a shipping box.

7 Claims, 14 Drawing Sheets

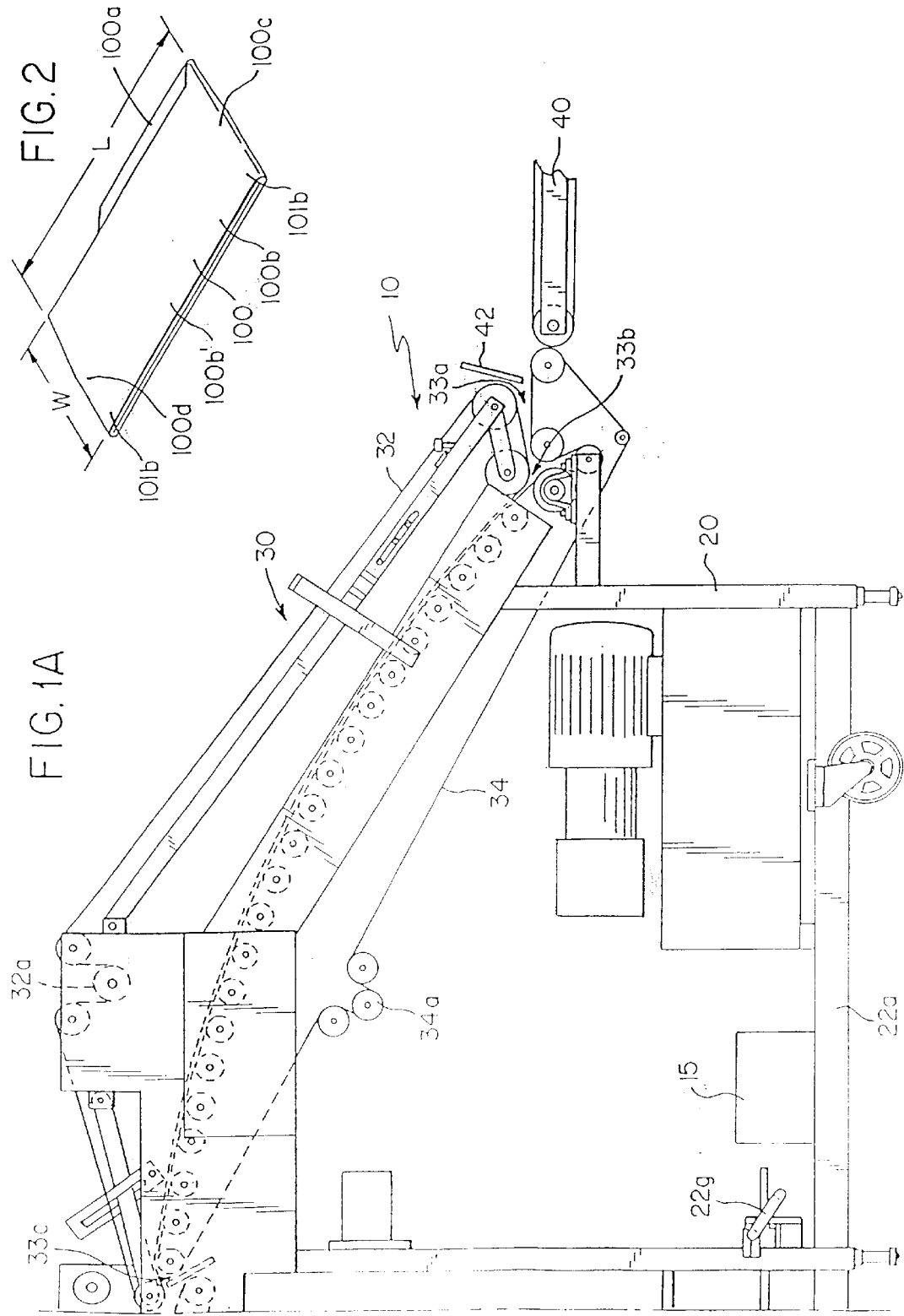

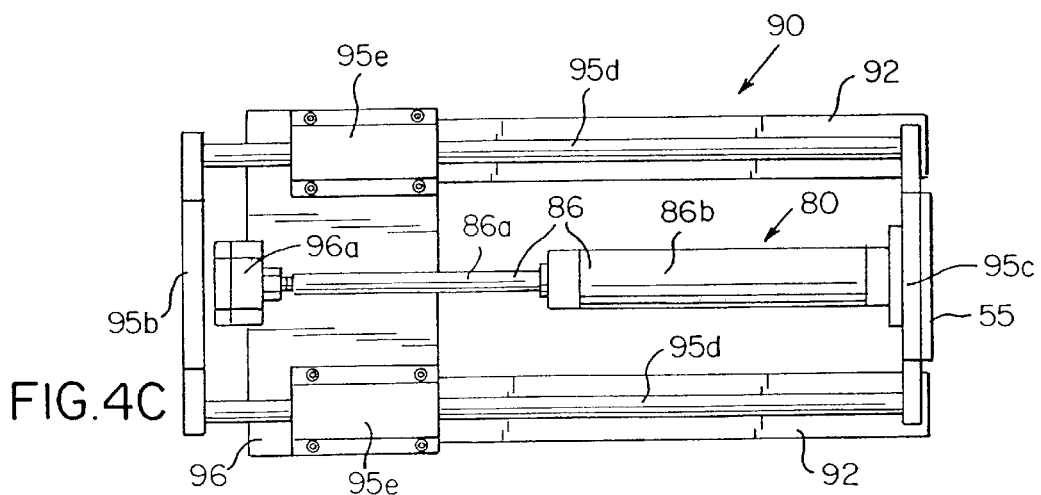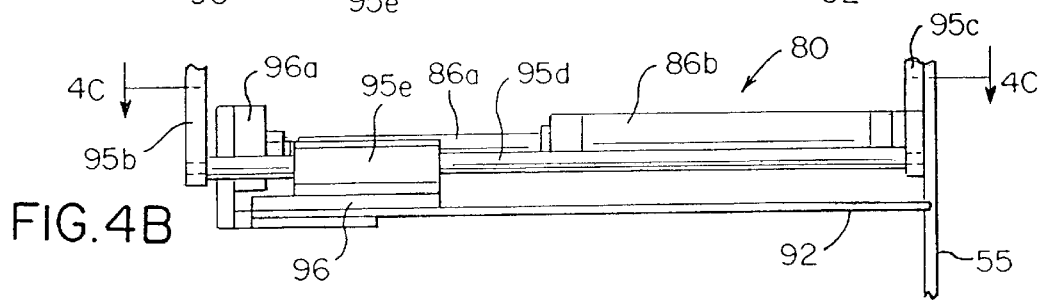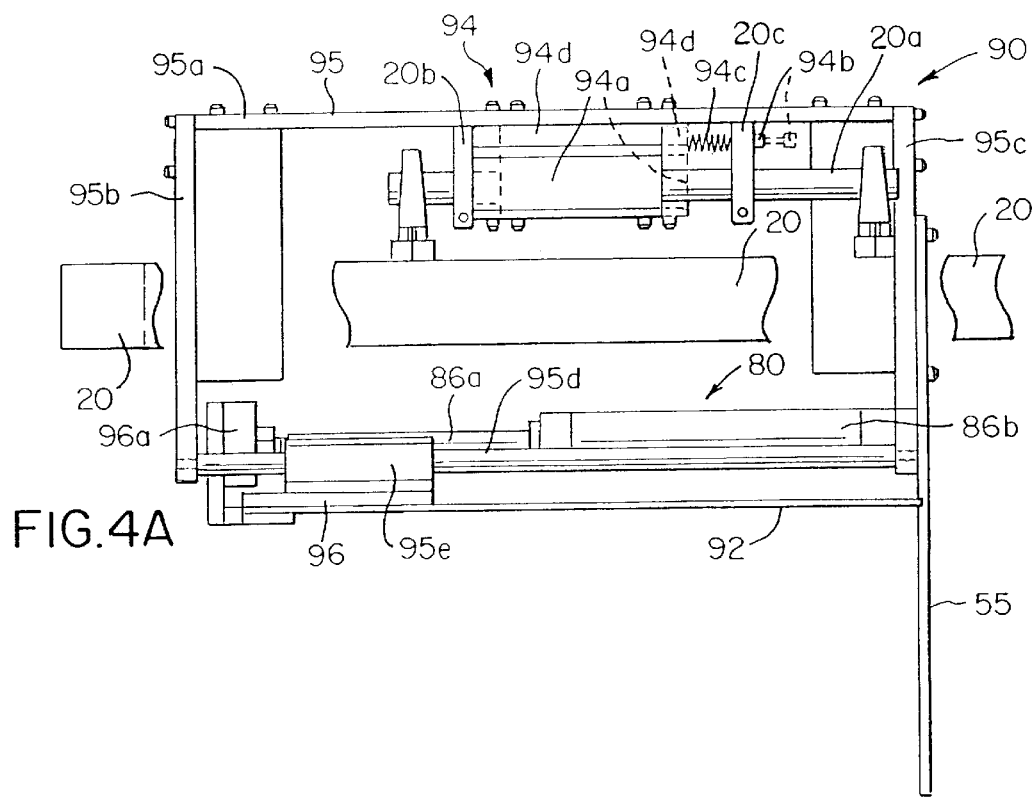

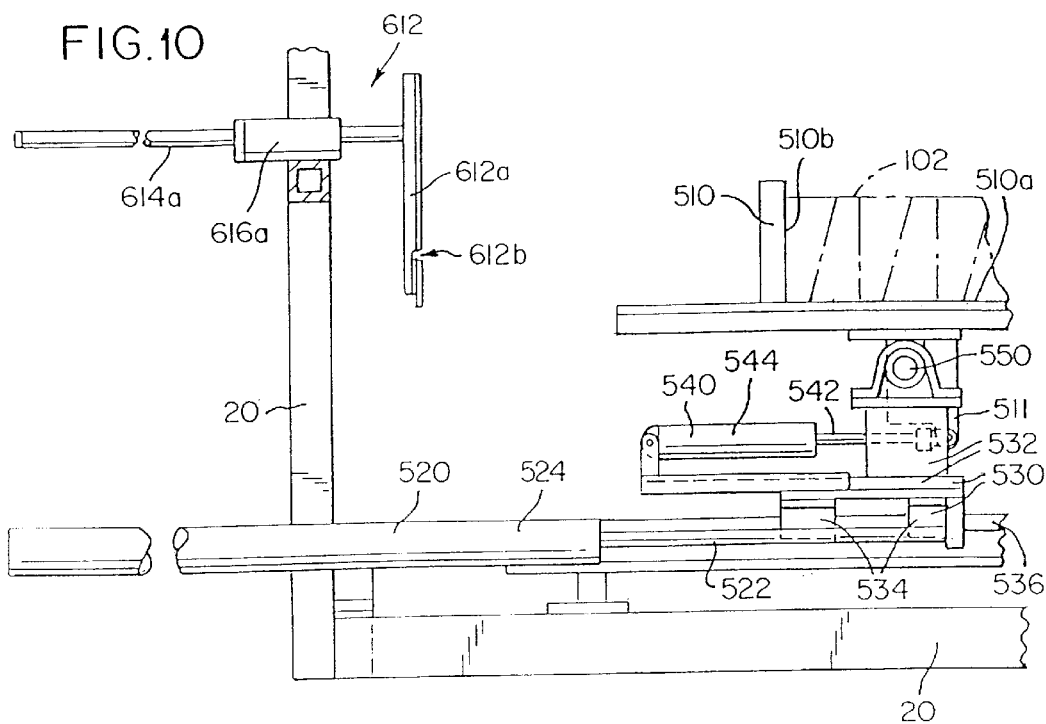
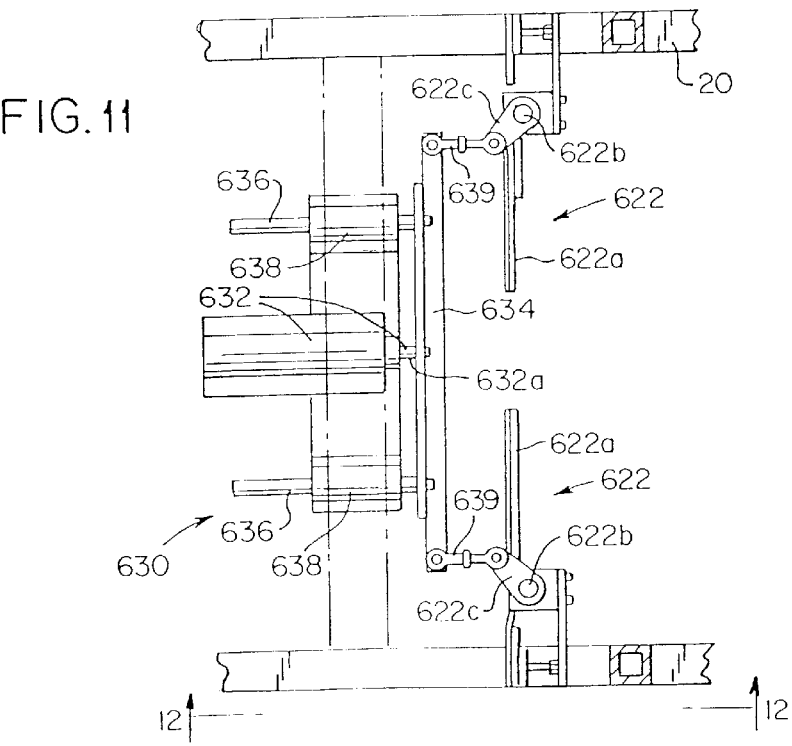

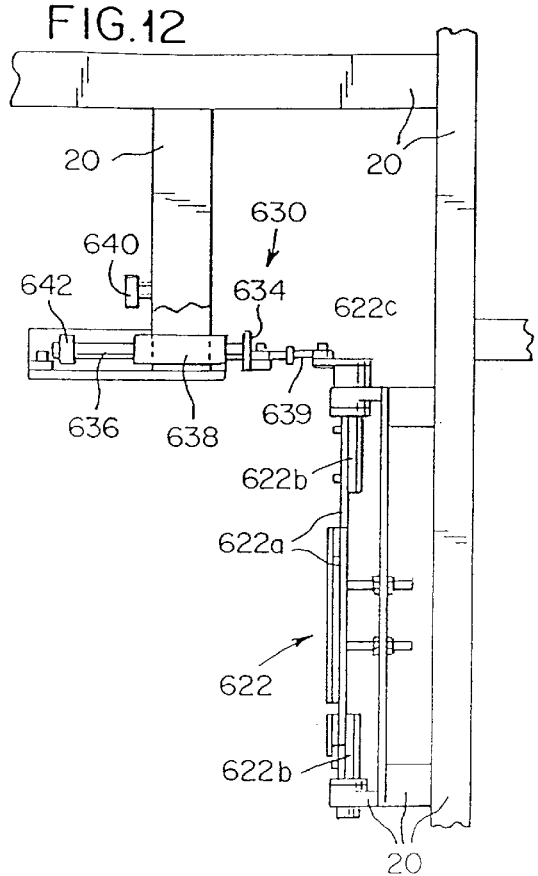
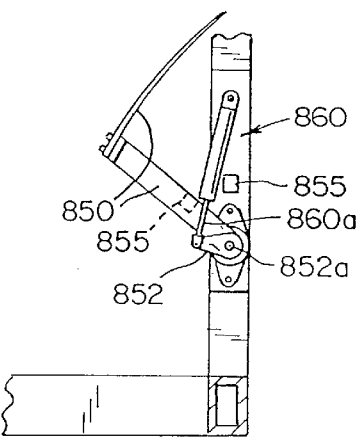
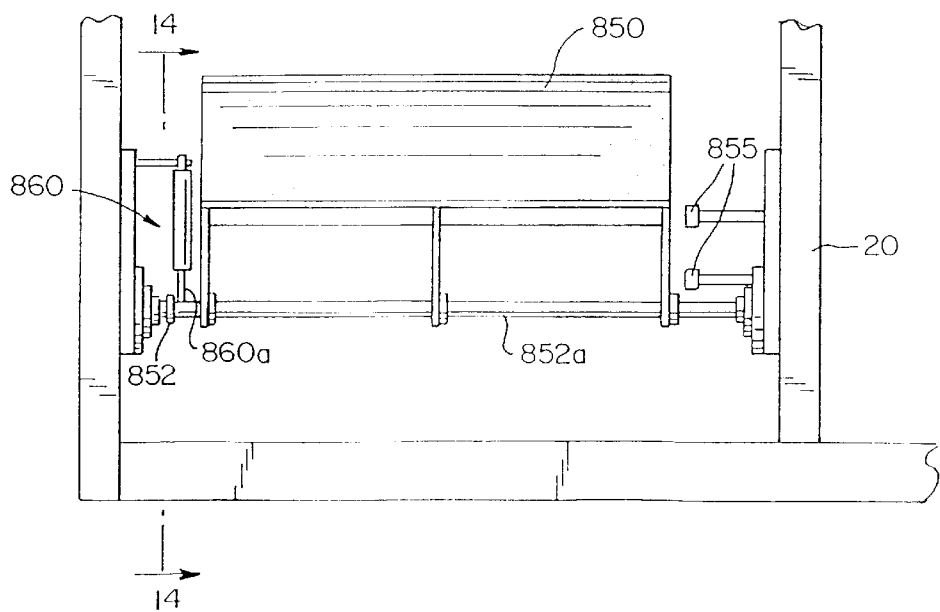

FOLDED CARTON STACKING AND PACKING APPARATUS

CROSS-REFERENCE TO RELATED APPLICATION

This application is a continuation of application Ser. No. 08/915,826 filed Aug. 21, 1997.

FIELD OF THE INVENTION

The present invention is directed to apparatus for stacking flat folded cartons or container boxes of non-uniform thickness and automatically packing those stacked cartons into a shipping container.

BACKGROUND OF THE INVENTION

It is known in the prior art to stack folded cartons having ends of non-uniform thickness. For example, U.S. Pat. No. 4,264,255 to Saro et al. teaches a device for stacking folded boxes wherein each box has unequal thicknesses at its end portions. The '255 patent, however, does not disclose apparatus for automatically accumulating a plurality of stacks of folded cartons and inserting those accumulated stacks into a shipping container.

Accordingly, there is a need for an apparatus for stacking folded cartons having ends of non-uniform thickness, accumulating those stacks, and automatically packing the stacked cartons into a shipping container.

SUMMARY OF THE INVENTION

This need is met by the present invention, wherein apparatus is disclosed for receiving folded cartons of non-uniform thickness from, for example, a conventional gluing device, stacking those cartons into stacks of a predefined number, rotating successive stacks 180° from each other in order to compensate for the uneven or non-uniform thickness of each folded carton, dropping two or more stacks of the folded cartons from a rotatable hopper into a slug building area and then, once a slug of a desired size is built, tilting the slug until the plane of each folded carton is vertically oriented (i.e., the slug lies horizontally) and then automatically loading the slug into a shipping box.

BRIEF DESCRIPTION OF THE DRAWINGS

FIGS. 1A and 1B illustrate an apparatus constructed in accordance with the present invention for stacking flat folded cartons of non-uniform thickness and automatically packing those stacked cartons into a shipping container;

FIG. 2 is a perspective view of a folded carton adapted to be stacked and inserted into a container box by the apparatus of FIGS. 1A and 1B;

FIG. 4A is a side view of an interrupt finger assembly of the apparatus illustrated in FIGS. 1A and 1B;

FIG. 4B is a side view of a portion of the finger assembly illustrated in FIG. 4A;

FIG. 4C is a view taken along view line 4C—4C in FIG. 4B;

FIG. 10 is a view taken along view line 10—10 in FIG. 9;

FIG. 11 is a top view of the two second side guides and a piston/cylinder assembly for effecting pivotable movement of the side guides;

FIG. 12 is a view taken along view line 12—12 in FIG. 11;

FIG. 13 is a front view of a sheet inserter and a piston/cylinder unit for effecting pivotable movement of the sheet inserter;

FIG. 14 is a view taken along view line 14—14 in FIG. 13;

DETAILED DESCRIPTION OF THE PREFERRED EMBODIMENT

Figure 18:
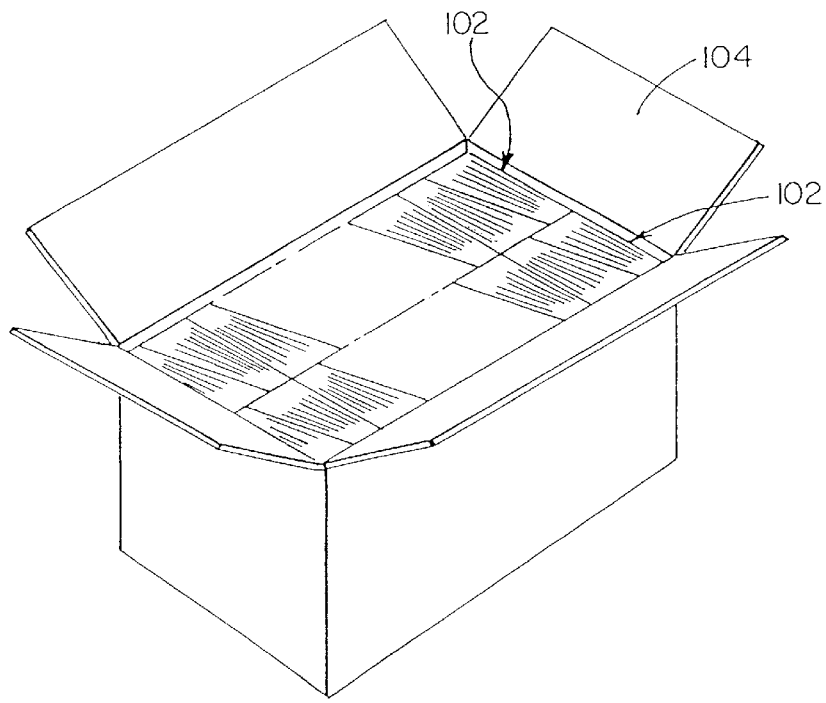
FIG. 18 is a perspective view of a shipping container packed with two slugs of folded cartons.

The invention pertains to an apparatus 10 for automatically stacking flat folded cartons or container boxes 100, see FIG. 2, of non-uniform thickness into a slug 102, see FIG. 18, and then automatically stuffing the slug 102 of folded cartons 100 into a shipping container 104, such as a corrugated cardboard box.

The apparatus 10 is supplied with a stream or line of folded cartons 100 overlapping each other like shingles. The stream of folded cartons 100 can be supplied by, for example, a conventional gluing device used to make the folded cartons 100. Such conventional gluing devices can produce folded cartons, in a top shingle form, at a rate of about 50,000 cartons/hour. The present apparatus is capable of processing the folded cartons 100 at this rate.

Figure 1B:
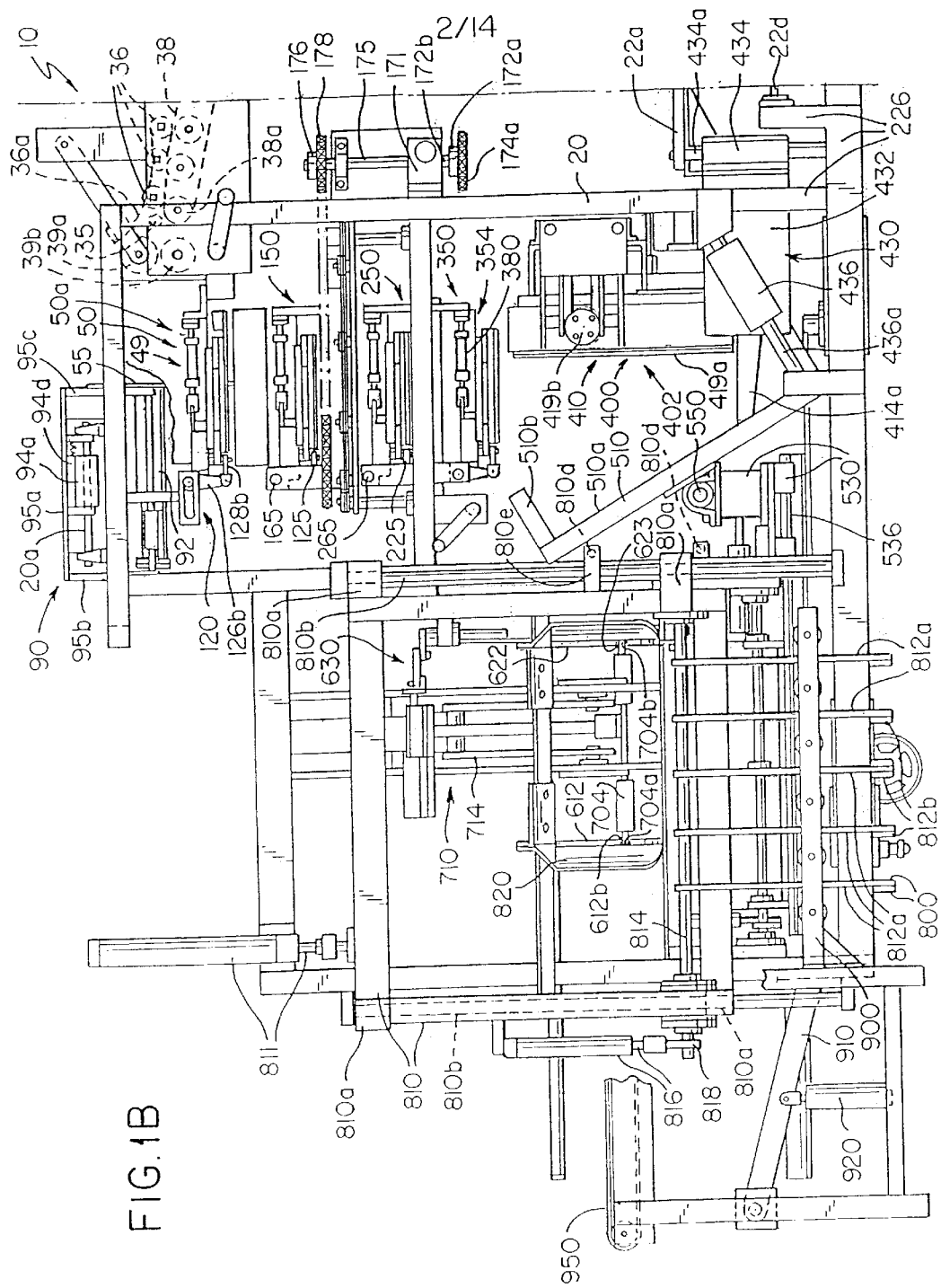

Referring now to FIGS. 1A and 1B, the apparatus 10 of the present invention includes a main support structure 20 and a conveyor apparatus 30 supported by the support structure 20. The conveyor apparatus 30 comprises upper and lower primary conveyor belts 32 and 34 which, in the illustrated embodiment, receive the stream of folded cartons (the stream of cartons is not shown in FIGS. 1A and 1B) from a conventional gluing device 40, see FIG. 1A. A discriminator 42 is positioned at a leading end 33a of the primary conveyor belts 32 and 34. As will be discussed more explicitly below, after a predefined number of cartons 100 have been conveyed to an exit end 33c of the belts 32 and 34, the first and second belts 32 and 34 dwell for a predetermined amount of time. When the belts 32 and 34 begin to rotate after the dwell period has ended, the discriminator 42 spaces apart the cartons 100 which have accumulated at the leading end 33a of the belts 32 and 34.

An upper drive roller 32a effects movement of the upper belt 32 and a lower drive roller 34a effects movement of the lower belt 34. The drive rollers 32a and 34a are coupled to and driven by a commercially available first hydraulic motor (not shown). A solenoid (not shown) controlled by a programmable logic controller 15, see FIG. 1A, opens and closes a first control valve (not shown) which in turn controls the operation of the first hydraulic motor. The speed of the first hydraulic motor is manually adjustable by way of a conventional first needle valve flow control (not shown), which is positioned between the first control valve and the motor. Thus, the first hydraulic motor is turned on and off via the solenoid and the first control valve and its speed is adjusted via the first valve flow control. Preferably, the belts 32 and 34 are driven at a speed which is greater than the speed at which the cartons 100 are supplied to the apparatus 10 by the device 40 so as to compensate for the dwell periods of the belts 32 and 34.

The shingled row of folded cartons are moved from the leading end 33a of the opposing conveyer belts 32 and 34 along a path 33b defined between the opposing belts 32 and 34 to the exit end 33c of the belts 32 and 34. The row of folded cartons 100 are then conveyed between a plurality of upper idler rollers 36, three in the illustrated embodiment, and a lower secondary conveyer belt 38. A drive roller 38a, coupled to and driven by the first hydraulic motor, effects movement of the belt 38. The belt 38 moves at substantially the same speed as the belts 32 and 34.

The upper rollers 36 are arranged in coaxial pairs and are mounted on a metal spring 36a. The upper rollers 36 in each pair are spread apart and mounted so as to contact and press the folded cartons 100 down onto the lower secondary conveyer belt 38. In this way, the folded cartons 100 are kept in contact with the lower secondary conveyer belt 38 such that the cartons 100 move at substantially the same linear speed as the belt 38.

Maintaining this contact enables the lower secondary conveyer belt 38 to convey the shingled row of folded cartons 100 in between a pair of top pinch rollers 39a and a pair of driven, bottom pinch rollers 39b. A second hydraulic motor (not shown) effects movement of the bottom pinch rollers 39b. The second motor runs continuously during operation of the apparatus 10. Its speed is manually adjustable by way of a second valve flow control (not shown). Preferably, the rollers 39b are driven at a speed which exceeds that of the rollers 32a, 34a and 38a. The pinch rollers 39a and 39b launch the folded cartons 100 outwardly into stack forming apparatus 49 at a stack building station. The stack forming apparatus 49 includes a first stack building hopper or first bin 50. A leading edge of each airborne folded carton hits a back plate 55 (e.g., a stop surface) forming the back wall of the first bin 50. With its momentum thus arrested, each folded carton 100 settles down into the bottom of the first bin 50. In this way, a first stack of the folded cartons 100 can be formed in the first bin 50.

The speed and angle at which the pinch rollers 39a and 39b expel the folded cartons 100 are important to the stack building process. If they are expelled too slowly or too quickly, or at an unsuitable angle, the folded cartons 100 will not settle into an even stack at the bottom of the first bin 50. The formation of uniform stacks of the folded cartons 100 is important to the downline operations of the present apparatus. The desired speed of the pinch rollers 39a and 39b and, hence, the desired speed of travel of the folded cartons 100 as they are expelled from the pinch rollers 39a and 39b, is controlled by the second flow control and is varied depending upon the mass of each folded carton 100. In general, as the mass of the folded carton 100 increases, its speed of travel should decrease. The carton ejection angle is adjusted by varying the position of the upper pinch rollers 39a. If the upper rollers 39a are moved to the left in FIG. 1B, the angle at which the cartons 100 are ejected will decrease, i.e., the angle will move downwardly toward the first bin 50. If the upper rollers 39a are moved to the right in FIG. 1B, the angle at which the cartons 100 are ejected will increase, i.e., the angle will move upwardly away from the first bin 50.

For a folded carton 100, see FIG. 2, having an end-to-end length L of about 11.19 inches, a width W of about 5.25 inches, a thickness of about 0.013 inch at a first end 100a (the first end 100a comprises a single layer of material), a thickness of about 0.054 inch in the center portion 100b' of a second end 100b (the center portion 100b' comprises four layers of material), a thickness of about 0.065 inch at outer portions 101b of the second end 100b (each outer portion 101b comprises five layers of material), and weighing about 1 ounce, satisfactory results have been obtained with the pinch rollers 39a and 39b and, hence, the folded cartons 100, moving at a linear speed in the range of from about 118 feet/minute to about 122 feet/minute, the belts 32, 34 and 38 moving at a linear speed of about 110 feet/minute to about 114 feet/minute, and the pinch rollers 39a and 39b being oriented so as to launch each folded carton 100 at an angle of about −5° to about +5° to horizontal and most preferably parallel to horizontal.

Figure 3A:
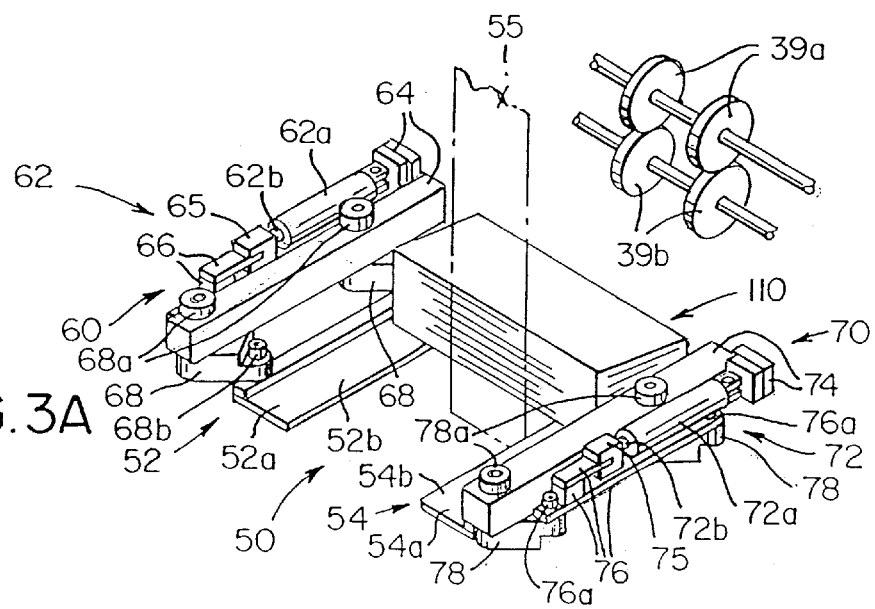
FIGS. 3A–3C are perspective views of portions of the first, second and third bins.
Figure 5:
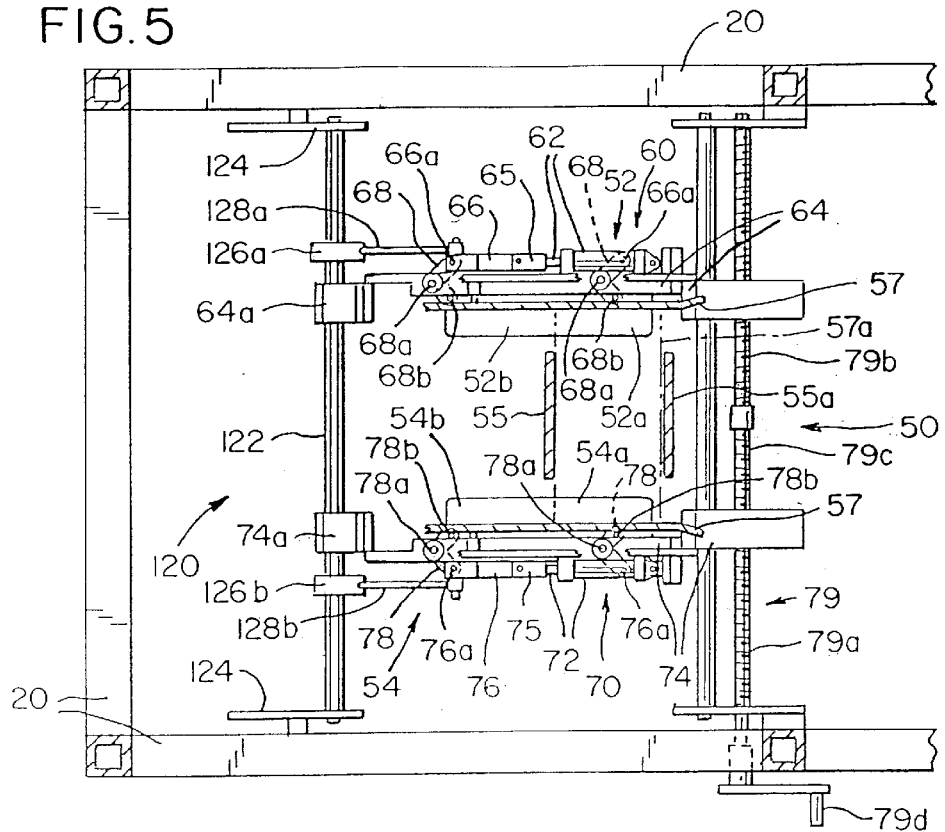
FIG. 5 is a top view of the first bin.

Referring now to FIGS. 3A and 5, the first bin 50 comprises opposing first and second gate assemblies 52 and 54. The first gate assembly 52 includes a movable first support bar 52a and the second gate assembly 54 includes a movable second support bar 54a. The first and second support bars 52a and 54a are movable between open and closed positions. When closed, the support bars 52a and 54a define a bottom of the first bin 50.

The first folded carton 100 in each stack comes to rest at the bottom of the first bin 50 with each of its side edges 100c and 100d being supported by the support bars 52a and 54a. Each of the support bars 52a and 54a has a lengthwise support shoulder or lip 52b and 54b. The side edges 100c and 100d of the first folded carton 100 come to rest directly on the support lips 52b and 54b. The remaining folded cartons 100 come to rest one on top of the other until a stack 110 is formed.

The first and second gate assemblies 52 and 54 further comprise first and second side walls 57 (shown in FIG. 5 and not in FIG. 3A) which are fixedly connected respectively to first and second stationary support structures 64 and 74. The first and second support structures 64 and 74 are fixedly coupled to the main support structure 20. A front plate 55a, which is vibrated by a motor (not shown), is positioned opposite to the plate 55. The side walls 57, the plates 55 and 55a, and the support bars 52a and 54a define a pocket 57a, see FIG. 5, for receiving the folded cartons 100.

First and second pneumatically actuated mechanisms 60 and 70 forming part of the first and second gate assemblies 52 and 54 are used to open and close the first and second support bars 52a and 54a. The opening of the support bars 52a and 54a causes the newly formed stack 110 to drop down into a stack rotating hopper or second bin 150, described below. The first and second pneumatically actuated mechanisms 60 and 70 close the first and second support bars 52a and 54a by moving the support bars 52a and 54a toward one another, see FIG. 3A.

The first pneumatically actuated mechanism 60 includes a first piston/cylinder unit 62, see FIGS. 3A and 5, which is in fluid communication with a first support bar valve (not shown) connected to a source (not shown) of pressurized pneumatic fluid. A solenoid (not shown) is provided to open and close the first support bar valve which, in turn, controls the operation of the unit 62. Actuation of the solenoid is controlled via the controller 15. The cylinder 62a of the unit 62 is fixedly coupled to the stationary first support structure 64. The piston 62b of the unit 62 is coupled via a yoke 65 to a first movable arm 66. The movable arm 66 is in turn connected via pins 66a to first and second pivotable cams 68. The cams 68 are pivotably connected to the stationary support structure 64 via pins 68a. The first support bar 52a is pivotably coupled to the cams 68 via two pins 68b. Linear back and forth movement of the movable arm 66 via the piston/cylinder unit 62 effects pivotable movement of the cams 68 about the pins 68a. Movement of the cams 68 in turn effects movement of the first support bar 52a toward or away from the second support bar 54.

The second pneumatically actuated mechanism 70 includes a second piston/cylinder unit 72 which is in fluid communication with the first support bar valve such that the first support bar valve controls the operation of both piston/cylinder units 62 and 72. The cylinder 72a of the unit 72 is fixedly coupled to the stationary second support structure 74. The piston 72b of the unit 72 is connected via a yoke 75 to a second movable arm 76. The movable arm 76 is in turn connected via pins 76a to third and fourth pivotable cams 78. The cams 78 are pivotably connected to the support structure 74 via pins 78a. The second support bar 54a is pivotably coupled to the cams 78 via two pins 78b. Linear back and forth movement of the movable arm 76 via the piston/cylinder unit 72 effects pivotable movement of the pivotable cams 78 about the pins 78a. Pivotable movement of the cams 78 in turn effects movement of the second support bar 54a towards or away from the first support bar 52a.

The extension of the first and second pistons 62b and 72b causes the first and second support bars 52a and 54a to move away from one another so as to open the first bin 50. The retraction of the first and second pistons 62b and 72b causes the support bars 52a and 54a to move toward one another such that the first bin 50 is closed.

A timing assembly 120 is coupled to the first and second gate assemblies 52 and 54 so as to structurally connect the two assemblies 52 and 54 together to ensure that the two assemblies 52 and 54 open and close generally simultaneously. The assembly 120 comprises a rotatable shaft 122 extending through two bearings mounted in end portions 64a and 74a of the support structures 64 and 74, see FIG. 5. The shaft 122 also extends through two opposing plates 124 which are fixedly mounted to the support structure 20. First and second arms 126a and 126b are mounted to the shaft 122 so as to rotate with the shaft 122. A first tie rod 128a is pivotably connected to the first arm 126a and to one of the cams 68. A second tie rod 128b is pivotably connected to the second arm 126b and to one of the cams 78. If the cam 68 moves before the cam 78, its movement is transferred to the cam 78 via the first tie rod 128a, the second tie rod 128b, the arms 126a and 126b and the shaft 122. Similarly, if the cam 78 moves before the cam 68, its movement is transferred to the cam 68 via the first tie rod 128a, the second tie rod 128b, the arms 126a and 126b and the shaft 122.

A screw mechanism 79 is provided to allow for adjustment of the spacing between the first and second gate assemblies 52 and 54 so as to permit cartons 100 of various lengths L to be processed by the apparatus 10, see FIG. 5. The screw mechanism 79 extends between and is coupled to two beams of the support structure 20. It includes a screw 79a having first and second oppositely threaded portions 79b and 79c. The screw 79a threadedly engages and extends through the first and second support structures 64 and 74. When the screw 79a is rotated via a manual crank 79d, the support structures 64 and 74 are moved either toward or away from one another by the screw 79a.

A conventional optical sensor 35, such as one which is manufactured by QTMS and commercially available from Plum Tree Co., Savannah, Ga., under the product designation "Copy Counter 2," is positioned so as to sense the folded cartons 100 as they exit from between the rollers 36 and the belt 38, see FIG. 1B. A conventional optical counter (not shown), which is commercially available from Red Lion Controls, U.S.A., York, Pa., and sold under the product designation "LIBC1E00," receives count signals from the sensor 35. Based upon these received signals, received signals, the counter keeps count of the cartons 100 exiting between the rollers 36 and the belt 38. Once the desired number of folded cartons 100 for forming a stack 110 is reached, the optical counter generates a stack-completed signal to the controller 15. After receiving the stack-completed signal, the controller 15 temporarily halts the operation of the conveyer belts 32, 34 and 38. For the above described exemplary folded carton 100, stacks of 25 folded cartons 100 have been found desirable. The conveyer belts 32, 34 and 38 are stopped long enough to create a gap in the stream of cartons 100 traveling to the first bin 50. For the above described exemplary folded carton and belt speeds, satisfactory results have been obtained when the conveyer belts 32, 34 and 38 are stopped for a period of from about 0.2 second to about 0.5 second and most preferably about 0.3 second in between each count of 25 folded cartons.

After the operation of the conveyer belts 32, 34 and 38 has been temporarily stopped, the controller 15 activates a pneumatically actuated mechanism 80 forming part of an interrupt finger assembly 90, see FIGS. 4A–4E, so as to move a pair of interrupt fingers 92 forming part of the assembly 90 from a standby position, away from an entrance 50a into the first bin 50, see FIG. 1B, to an interrupt position over the entrance 50a to the first bin 50 to prevent any folded cartons 100 exiting the pinch rollers 39a and 39b from entering the first bin 50. In this way, the interrupt fingers 92 act as a safety feature to prevent the folded cartons 100 for a subsequent stack from being added to the preceding stack. The interrupt fingers 92 accomplish this by blocking the path into the first bin 50 until the preceding stack has dropped out of the first bin 50 and into the second bin 150 and the support bars 52a and 54a have returned to their closed position. The activation of the pneumatically actuated mechanism 80 is timed so that the movement of the interrupt fingers 92 does not interfere with the complete formation of a stack 110. That is, after the operation of the belts 32, 34 and 38 is temporarily halted, the controller 15 delays the movement of the interrupt fingers 92 to their interrupt position long enough to allow the last folded carton 100 of the preceding stack to settle into the first bin 50.

It is believed that the interrupt fingers 92 could be eliminated by choosing a delay period for the temporary halting of the conveyer belts 32, 34 and 38 which is long enough to ensure that folded cartons 100 for the next stack do not reach the first bin 50 until the preceding stack has left the first bin 50 and the first and second support bars 52a and 54a have returned to their closed position. Though, it is believed more desirable for the apparatus 10 to include the interrupt finger feature because it allows this delay period to be reduced, thereby increasing the overall throughput rate of the apparatus 10.

Figure 4D:
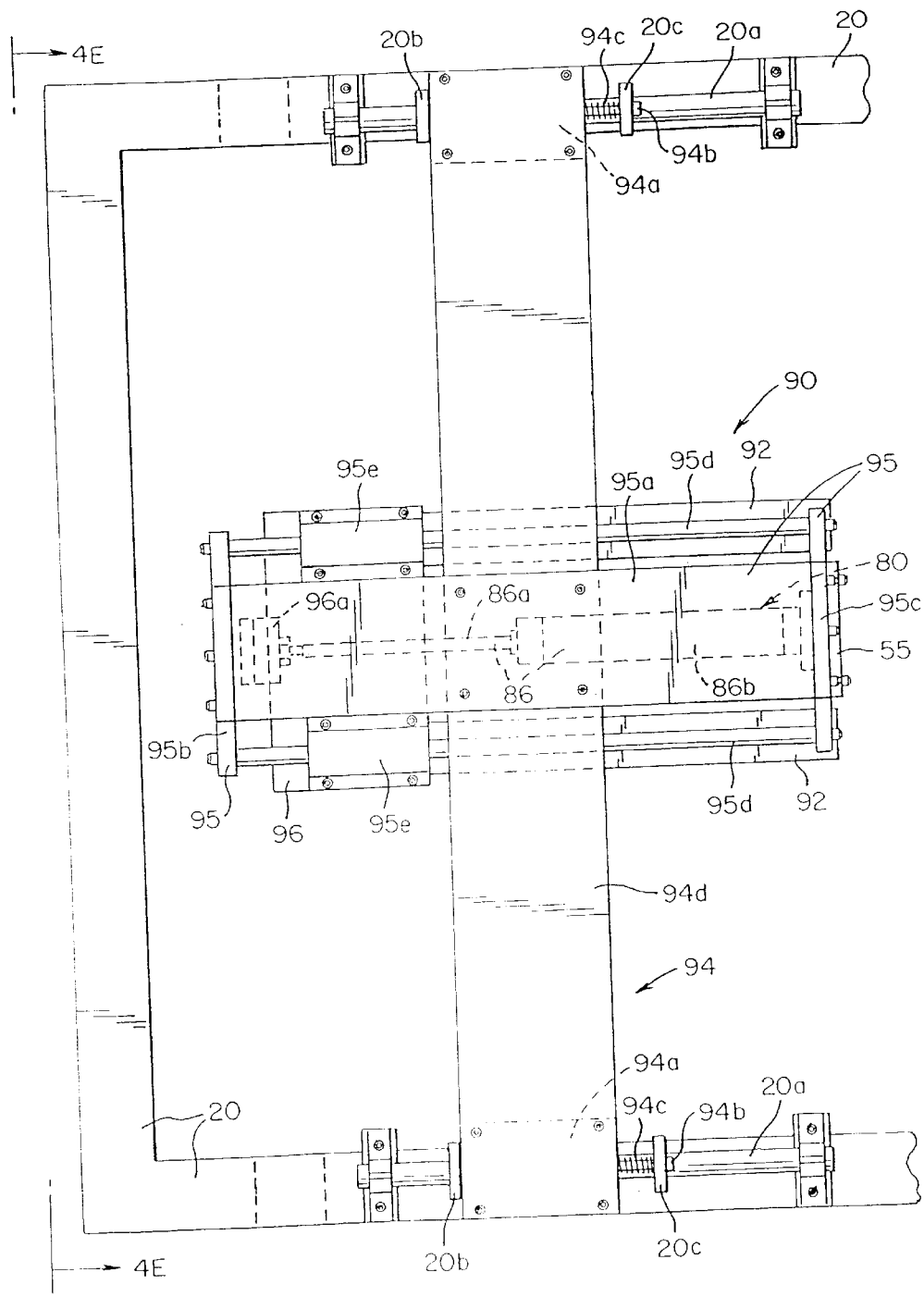
FIG. 4D is a top view of the interrupt finger assembly of the present invention.
Figure 4E:
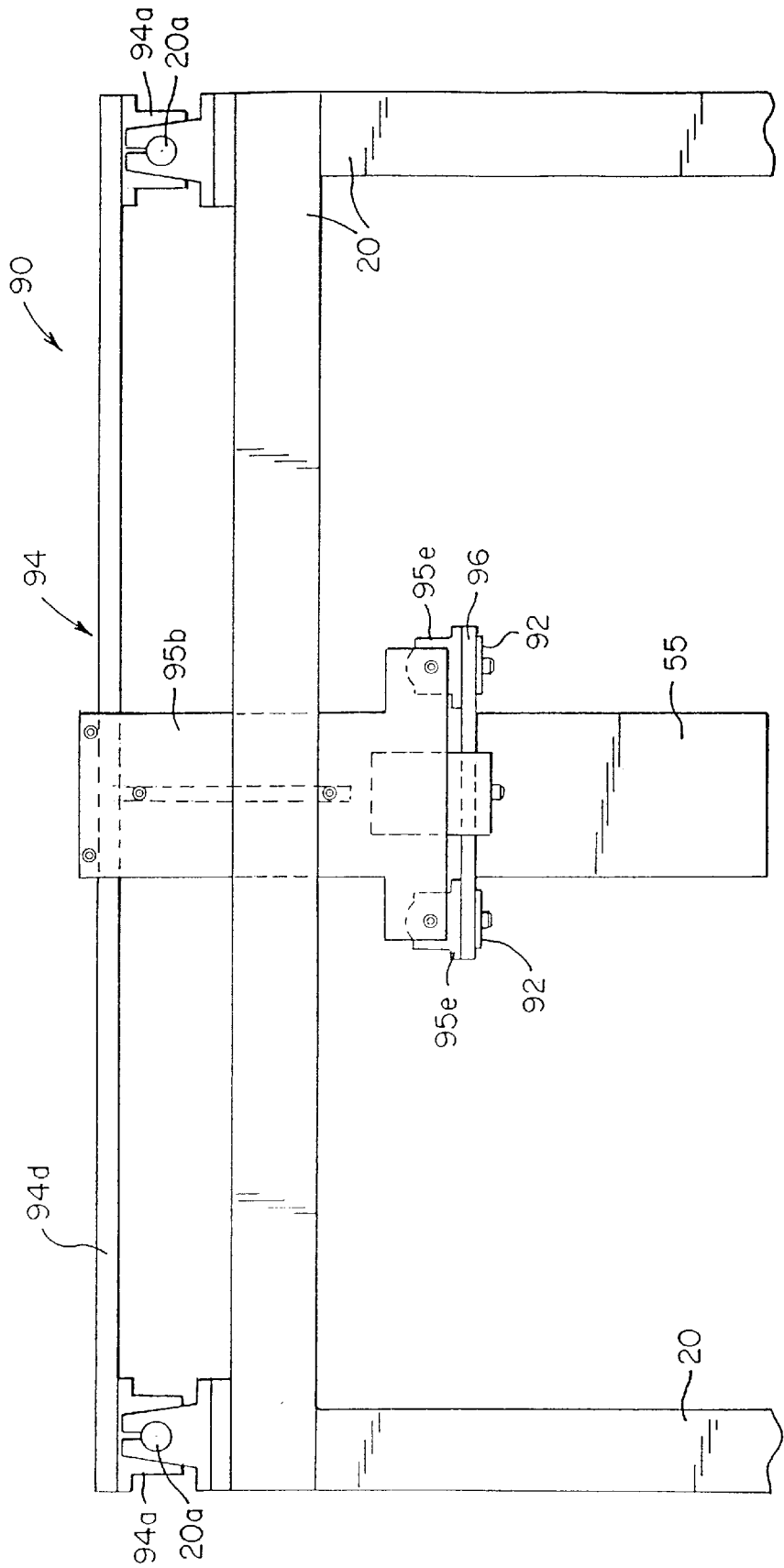
FIG. 4E is a view taken along view line 4E—4E in FIG. 4D.

The interrupt finger assembly 90 further comprises a frame 94 coupled to a pair of linear bearings 94a which move along two shafts 20a fixedly connected to the support structure 20, see FIGS. 4D and 4E. First and second adjustable stops 20b and 20c are provided on each of the two shafts 20a and are spaced apart from one another so as to define portions of the shafts 20a along which the linear bearings 94a may travel. The frame 94 comprises a first plate 94d extending between and fixedly connected to the two bearings 94a, see FIG. 4D. A bolt 94b is threadedly coupled to and extends out from opposing ends of the plate 94d. Each bolt 94b passes through a bore in one of the stops 20c. A spring 94c surrounds each bolt 94b and is interposed between the stop 20c and the plate 94d so as to bias the plate 94d in a direction toward the opposite stop 20b. The head of each bolt 94b is on the side of the stop 20c opposite the side which engages the spring 94c.

The frame 94 additionally includes a U-shaped structure 95 comprising second, third and fourth plates 95a–95c. The second plate 95a is connected directly to the first plate 94d and extends substantially transversely to the first plate 94d, see FIG. 4D. The third and fourth plates 95b and 95c extend downwardly from the second plate 95a, see FIG. 4A.

A second pair of shafts 95d extend between the third and fourth plates 95b and 95c, see FIGS. 4A–4D. A pair of linear bearings 95e move along the shafts 95d. A plate 96 to which the interrupt fingers 92 are fixedly attached is coupled to the bearings 95e so as to move with the bearings 95e.

The pneumatically actuated mechanism 80 effects movement of the plate 96 and hence the fingers 92 toward and away from the pinch rollers 39a and 39b. The mechanism 80 includes a piston/cylinder unit 86 having a piston 86a and a cylinder 86b. The piston/cylinder unit 86 is associated with an interrupt finger valve (not shown) connected to the source of pressurized pneumatic fluid. A solenoid (not shown) is provided to open and close the interrupt finger valve which in turn controls the operation of the unit 86. The operation of the solenoid is controlled via the controller 15.

The cylinder 86b is fixedly connected to the fourth plate 95c. The piston 86a is fixedly connected to the plate 96 via a block 96a such that the plate 96 moves with the piston 86a. When the piston 86a is extended, the plate 96 is positioned adjacent to the third plate 95b and the interrupt fingers 92 are in their standby position. When the piston 86a is retracted, the plate 96 is positioned near the fourth plate 95c and the interrupt fingers 92 are in their interrupt position.

The back plate 55 of the first bin 50 is fixedly mounted to the fourth plate 95c so as to move with the fourth plate 95c. When the piston 86a is moved to its retracted position, i.e., is moved into the cylinder 86b, its causes the plate 96 and the bearings 95e coupled to the plate 96 to move from a position adjacent to the third plate 95b to a position adjacent to the fourth plate 95c. The fingers 92 also move from their standby position to their interrupt position. The change in momentum of the plate 96, the bearings 95e, the fingers 92 and the piston 86a, as they come to a rest once the piston 86a has been fully retracted into the cylinder 86b, results in the first plate 94d, the bearings 94a, the U-shaped structure 95 and the elements secured to the U-shaped structure 95 moving slightly towards the first bin 50. In FIG. 4A, one of the bearings 94a and the plate 94d are shown in phantom moving to the right against the force of the spring 94c. The bolt 94b is also shown in phantom moving through the bore in the stop 20c such that the head of the bolt 94b is spaced from a side wall of the stop 20c. This movement of the U-shaped structure 95 results in the back plate 55 moving a short distance toward the stack 110 of cartons 100 in the first bin 50 such that the back plate 55 engages the stack 110. By engaging the stack 110, the back plate 55 acts as an alignment device to square-up or vertically align the stack 110 before it drops from the first bin 50 into the second bin 150. It is desirable to maintain the stacks in a vertically aligned or squared-up condition to help ensure trouble-free processing through the apparatus 10. For the above described exemplary folded carton 100, the back plate 55 moves a distance of about 0.25 inch.

Right after the back plate 55 stops moving, the first and second support bars 52a and 54a are opened and the squared-up stack 110 is dropped into the second bin 150. The interrupt fingers 90 remain over the first bin entrance, in the interrupt position, until the stack 110 that had just been formed has dropped down into the second bin 150 and the first and second support bars 52a and 54a have closed.

Thus, once a predetermined number of cartons 100, e.g., 25, have been counted by the optical counter, the controller 15 causes the belts 32, 34 and 38 to dwell for a predefined period of time, e.g., 0.3 second. The interrupt fingers 92 then move to their interrupt position such that any cartons 100 for a subsequent stack are prevented from being added to the preceding stack in the first bin 50. Also, the back plate 55 contacts the cartons 100 in the first bin 50 to align or square-up those cartons 100. Thereafter, the first and second support bars 52a and 54a separate from one another so as to drop the squared-up stack 110 into the second bin 150.

When the flow of folded cartons 100 resumes at the end of the dwell period, the pinch rollers 39a and 39b initially deposit the folded cartons 100 on top of the interrupt fingers 90 to begin the formation of the next stack 110. If the interrupt fingers 90 are not used, as described above, the folded cartons 100 forming the next stack 110 are deposited directly into the first bin 50 in the same manner as the first stack.

Figure 3B:
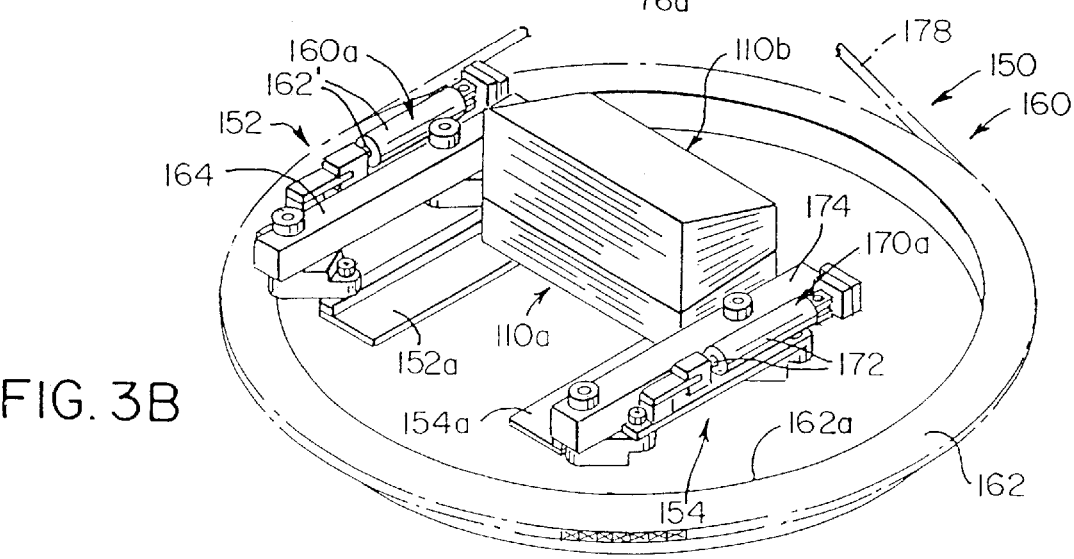

After the first stack, designated by the reference numeral 100a in FIG. 3B, has dropped into the second bin 150 and the first and second support bars 52a and 54a of the first bin 50 have closed, the controller 15 activates the pneumatically actuated mechanism 80 to extend the piston 86a until the interrupt fingers 90 are returned to their standby position, in preparation of being moved again to catch the folded cartons 100 that will form the beginning of the next or third stack. While the interrupt fingers 90 are moving back to the standby position, the pinch rollers 39a and 39b continue to deposit folded cartons 100 into the first bin 50, continuing to build the second stack. Further, the folded cartons 100 positioned on the interrupt fingers 90 move off the fingers 90 due to their engagement with the plate 55 and drop down to the bottom of the first bin 50, coming to rest on the first and second support bars 52a and 54a.

Figure 6:
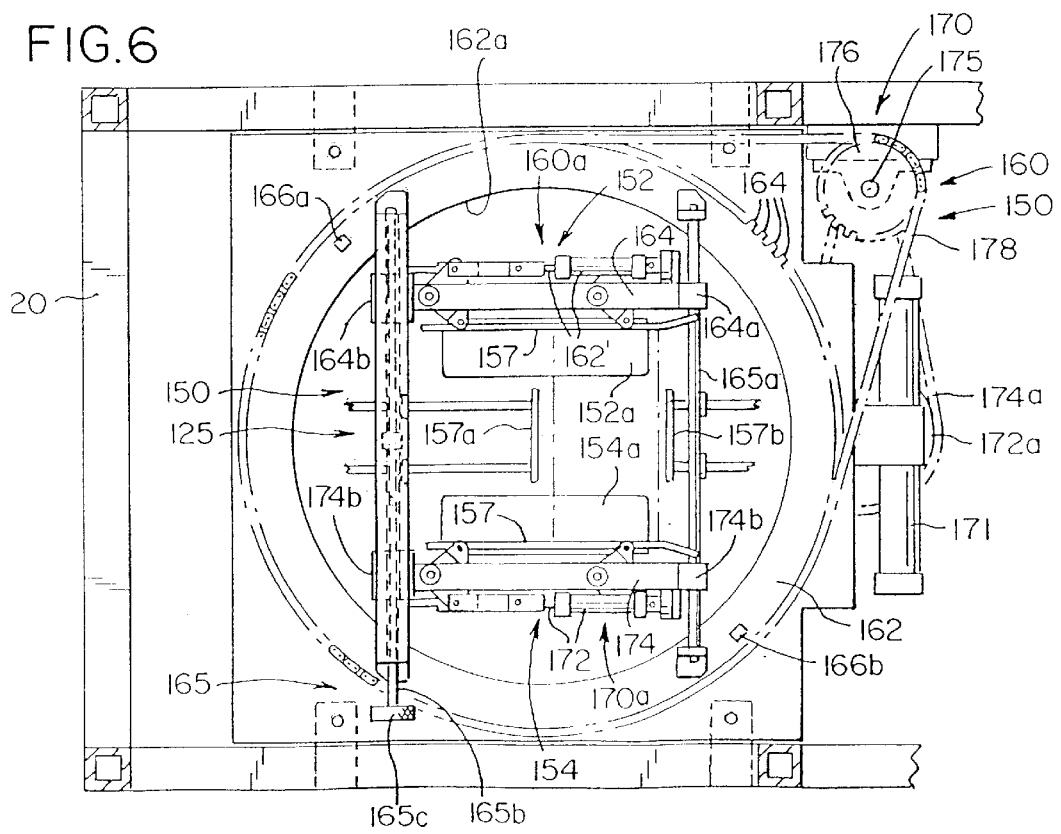
FIG. 6 is a top view of the second bin.

The second bin (stack rotating hopper) 150 includes a stack rotating mechanism 160 for rotating successive stacks 180° from each other in order to compensate for the uneven or-non-uniform thickness of each folded carton 100, see FIGS. 3B and 6. The stack rotating mechanism 160 includes a sprocket wheel or ring 162 having an outside diameter formed with a plurality of sprocket teeth 164 and an inside diameter defining a ring opening 162a of sufficient size to allow for the passage of the folded cartons 100, in stack form, therethrough down to a stack holding hopper or third bin 250 located therebelow. The sprocket ring 162 is mounted on bearings which allow the sprocket ring 162 to rotate about an axis of rotation passing through the center of the ring opening 162a.

A sprocket and chain assembly 170, driven by a rotary hydraulic cylinder 171, engages the sprocket teeth 164 to rotate the sprocket ring 162 about the axis of rotation. The assembly 170 comprises a first sprocket 172a coupled to a rotary shaft 172b of the hydraulic cylinder 171 so as to rotate with the rotary shaft 172b, see FIGS. 1B and 6. A first chain 174a extends about the first sprocket 172a and a second sprocket (not shown). The second sprocket is coupled to a first end of a shaft 175 so as to rotate with the shaft 175. A third sprocket 176 is coupled to an opposite end of the shaft 175 and also rotates with the shaft 175, see FIG. 6. A second chain 178 extends about the third sprocket 176 and the ring 162. The rotary hydraulic cylinder 171, in response to receiving control signals from the controller 15, drives the sprocket and chain assembly 170 to effect rotation of the sprocket ring 162 back and forth through an angle of approximately 180°.

First and second sensors (not shown), such as conventional proximity sensors are fixedly coupled to the frame 20 and sense first and second flags 166a and 166b positioned on the ring 162, see FIG. 6. The sensors generate position signals to the controller 15 indicative of the angular position of the ring 162 relative to the support 20.

The second bin 150 comprises opposing third and fourth gate assemblies 152 and 154 which are constructed in essentially the same manner as the first and second gate assemblies 52 and 54 described above. Briefly, the third gate assembly 152 includes a movable third support bar 152a and the fourth gate assembly 154 includes a movable fourth support bar 154a. The third and fourth support bars 152a and 154a are movable between open and closed positions. When closed, the support bars 152a and 154a define a bottom of the second bin 150.

The third and fourth gate assemblies 152 and 154 further comprise third and fourth side wails 157 (shown in FIG. 6 and not in FIG. 3B) which are fixedly connected respectively to third and fourth support structures 164 and 174. The assemblies 152 and 154 also comprise third and fourth pneumatically actuated mechanisms 160a and 170a for opening and closing the third and fourth support bars 152a and 154a. The third pneumatically actuated mechanism 160a includes a third piston/cylinder unit 162', see FIGS. 3B and 5, and the fourth pneumatically actuated mechanism 170a includes a fourth piston/cylinder unit 172. As the third and fourth pneumatically actuated mechanisms 160a and 170a are structurally the same as the first and second pneumatically actuated mechanisms 60 and 70 described above, they need not be described in further detail herein. The third piston/cylinder unit 162' and the fourth piston/cylinder unit 172 are in fluid communication with a control valve (not shown) connected to the source of pressurized pneumatic fluid. A solenoid (not shown) is provided to open and close the control valve which in turn controls the operation of the units 162' and 172. Actuation of the solenoid is controlled via the controller 15.

The opening of the support bars 152a and 154a causes two stacks 110 in the second bin 150 to drop down into a third bin 250, described below. The third and fourth pneumatically actuated mechanisms 160a and 170a close the third and fourth support bars 152a and 154a by moving the support bars 152a and 154a toward one another, see FIG. 3B.

The second bin 150 also comprises a timing assembly 125 which is constructed in essentially the same manner as the timing assembly 120 described above and, therefore, need not be described in further detail herein. The bin 150 additionally comprises adjustable front and rear walls 157a and 157b which together with the side walls 157 and the third and fourth support bars 152a and 154a define a pocket for receiving two stacks 110 of cartons 100.

The bin 150 also includes a screw adjustment mechanism 165 to allow for adjustment of the spacing between the third and fourth gate assemblies 152 and 154 so as to permit cartons 100 of various lengths L to be received in the second bin 150, see FIG. 6. The screw mechanism 165 extends between and is coupled to support structure on the ring 162 so as to rotate with the ring 162. It includes a screw 165b having first and second oppositely threaded portions. The screw 165b threadedly engages and extends through portions 164b and 174b of the support structures 164 and 174. When the screw 165b is rotated via a knob 165c, the support structures 164 and 174 are moved either toward or away from one another by the screw 165b.

Once a first stack 110a of folded cartons 100 is dropped into and comes to rest on the third and fourth support bars 152a and 154a of the second bin 150 and the first and second support bars 52a and 54a have closed, the controller 15 activates the rotary hydraulic cylinder 171 to rotate the sprocket ring 162 and, thereby, the first stack 100a 180°. When a second stack of folded cartons, designated by the reference numeral 110b in FIG. 3B, is formed, the first and second support bars 52a and 54a are opened in the same way as described above for the first stack 100a. The sprocket ring 162 is rotated only after every odd number stack 100 is deposited on the third and fourth support bars 152a and 154a. Thus, the second stack 100b drops down on top of the first stack 100a with the first stack 100a being oriented 180° from the second stack 100b, see FIG. 3B. Because each stack has one side that is thicker than the other, stacking the first and second stacks 100a and 100b in this way forms a double stack with a top carton 100 and a bottom carton 100 that are generally parallel. Once the second stack 100b settles onto the first stack 100a and the first and second support bars 52a and 54a have closed, the controller 15 opens the third and fourth support bars 152a and 154b and the double stack of folded cartons 100 is dropped into the third bin 250.

Figure 3C:
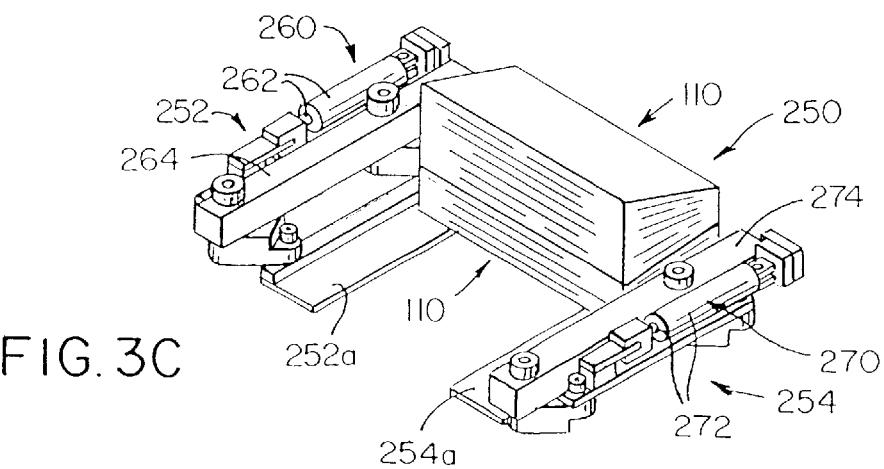

The third bin 250 comprises opposing fifth and sixth gate assemblies 252 and 254 which are constructed in essentially the same manner as the gate assemblies 52 and 54 described above, see FIG. 3C. Briefly, the fifth gate assembly 252 includes a movable fifth support bar 252a and the sixth gate assembly 254 includes a movable sixth support bar 254a. The fifth and sixth support bars 252a and 254a are movable between open and closed positions. When closed, the support bars 252a and 254a define a bottom of the third bin 250.

The fifth and sixth gate assemblies 252 and 254 further comprise fifth and sixth side walls (not shown) which are fixedly connected respectively to fifth and sixth support structures 264 and 274. The assemblies 252 and 254 also comprise fifth and sixth pneumatically actuated mechanisms 260 and 270 for opening and closing the fifth and sixth support bars 252a and 254a, see FIG. 3C. The fifth pneumatically actuated mechanism 260 includes a fifth piston/cylinder unit 262, and the fifth pneumatically actuated mechanism 270 includes a sixth piston/cylinder unit 272. As the fifth and sixth pneumatically actuated mechanisms 260 and 270 are structurally the same as the first and second pneumatically actuated mechanisms 60 and 70 described above, they need not be described in further detail herein. The fifth piston/cylinder unit 262 and the sixth piston/cylinder unit 272 are in fluid communication with a third bin control valve (not shown) connected to the source of pressurized pneumatic fluid. A solenoid (not shown) is provided to open and close the third bin valve which in turn controls the operation of the units 262 and 272.

Actuation of the solenoid is controlled via the controller 15.

The opening of the support bars 252a and 254a causes two stacks 110 in the third bin 250 to drop down into a fourth bin 350, described below. The fifth and sixth pneumatically actuated mechanisms 260 and 270 close the fifth and sixth support bars 252a and 254a by moving the support bars 252a and 254a toward one another, see FIG. 3C.

The third bin 250 also comprises a timing assembly 225, see FIG. 1B, which is constructed in essentially the same manner as the timing assembly 120 described above and, therefore, need not be described in detail herein. The bin 250 additionally comprises adjustable front and rear walls (not shown) which are similar to the front and rear walls 157a and 157b of the second bin 150. The front and rear walls along with the side walls and the fifth and sixth support bars 252a and 254a define a pocket for receiving two stacks 110 of cartons 100. The bin 250 further includes a screw adjustment mechanism 265, see FIG. 1B, to allow for adjustment of the spacing between the fifth and sixth gate assemblies 252 and 254. The screw adjustment mechanism 265 is constructed in essentially the same manner as the mechanism 165 described above. The screw adjustment mechanism 265 is mounted to the fifth and sixth support structures 264 and 274.

After allowing two stacks 110 to drop into the third bin 250, the third and fourth support bars 152a and 154a are closed. While two stacks 110 wait in the third bin 250, the first and second support bars 52a and 54a are opened to allow a third stack of folded cartons 110, built in the first bin 50, to be dropped from the first bin 50 to the second bin 150 and onto the third and fourth support bars 152a and 154a. The first and second support bars 52a and 54a are then closed, and the sprocket ring 162 is rotated 180°. During rotation of the sprocket ring 162, the fifth and sixth gates 252a and 254a open causing the first and second stacks 110a and 110b to drop down into the fourth bin 350. After allowing the double stack to drop into the fourth bin 350, the fifth and sixth support bars 252a and 254a are closed in order to receive the next double stack that will be dropping from the second bin 150 in the manner described above for the previously formed double stack (i.e., the first and second stacks).

After the sprocket ring 162 finishes rotating, the first and second support bars 52a and 54a open again and a fourth stack is dropped onto the rotated third stack to form another double stack having a generally parallel top and bottom. The fourth stack is formed and drops through the first and second support bars 52a and 54a in the same manner as described above for the second stack. The first and second support bars 52a and 54a then close to receive a fifth stack. As soon as the first and second support bars 52a and 54a close, the third and fourth support bars 152a and 154a open to allow the double stack, i.e., the third and fourth stacks, to fall from the second bin 150 into the third bin 250. As will be discussed further below, the fourth bin 350 opens at the same time that the third and fourth support bars 152a and 154a open.

The fourth bin 350 (shown in FIG. 1) is constructed in essentially the same manner as the third bin 250 and, therefore, will only be briefly described herein. The fourth bin 350 comprises opposing seventh and eighth gate assemblies (only the eighth gate assembly 354 is shown) which are constructed in essentially the same manner as the gate assemblies 52 and 54 described above. Briefly, the seventh gate assembly includes a movable seventh support bar and the eighth gate assembly includes a movable eighth support bar. The seventh and eighth support bars are movable between open and closed positions. When closed, the support bars define a bottom of the fourth bin 350.

The seventh and eighth gate assemblies further comprise seventh and eighth pneumatically actuated mechanisms (only the eighth mechanism 380 is shown) which are constructed in essentially the same manner as the first and second pneumatically actuated mechanisms 70 and 80 and serve to open and close the seventh and eighth support bars. The seventh and eighth pneumatically actuated mechanisms include seventh and eighth piston/cylinder units which are in fluid communication with the control valve which controls the operation of the third and fourth piston/cylinder units 162 and 172. Thus, when the third and fourth support bars 152a and 154a are opened, the seventh and eighth support bars simultaneously open, and the double stack located in the fourth bin 350 drops down into and settles onto the bottom of a slug building/tilting hopper or pivotable slug bin 410 in a slug forming station 400, see FIG. 1B. Likewise, when the third and fourth support bars 152a and 154a close, the seventh and eighth support bars close, and the fourth bin 350 is ready to receive the next double stack of folded cartons 100.

An optical sensor, such as a photosensor (not shown), or some other suitable sensor is mounted adjacent to the fourth bin 350 so as to generate a signal to the controller 15 when a double stack is located in the fourth bin 350. Based upon these signals, the controller 15 keeps count of the number of double stacks which are dropped into the slug forming station 400.

The next double stack (i.e., the third and fourth stacks) is dropped down into a slug forming station 400 in the same manner as and on top of the first double stack (i.e., the first and second stacks). The above operation is repeated until a sufficient number of double stacks (i.e., an even number of alternating stacks) accumulate in the slug bin 410 to form a slug 102 of a desired size. For the exemplary folded carton 100 described above, satisfactory results have been obtained with each slug 102 built containing five double stacks of the folded cartons 100. Because of the above described 180° rotations of the sprocket ring 162, the resulting slug 102 of folded cartons 100 (i.e., of double stacks) has a generally parallel top and bottom.

Figure 7:
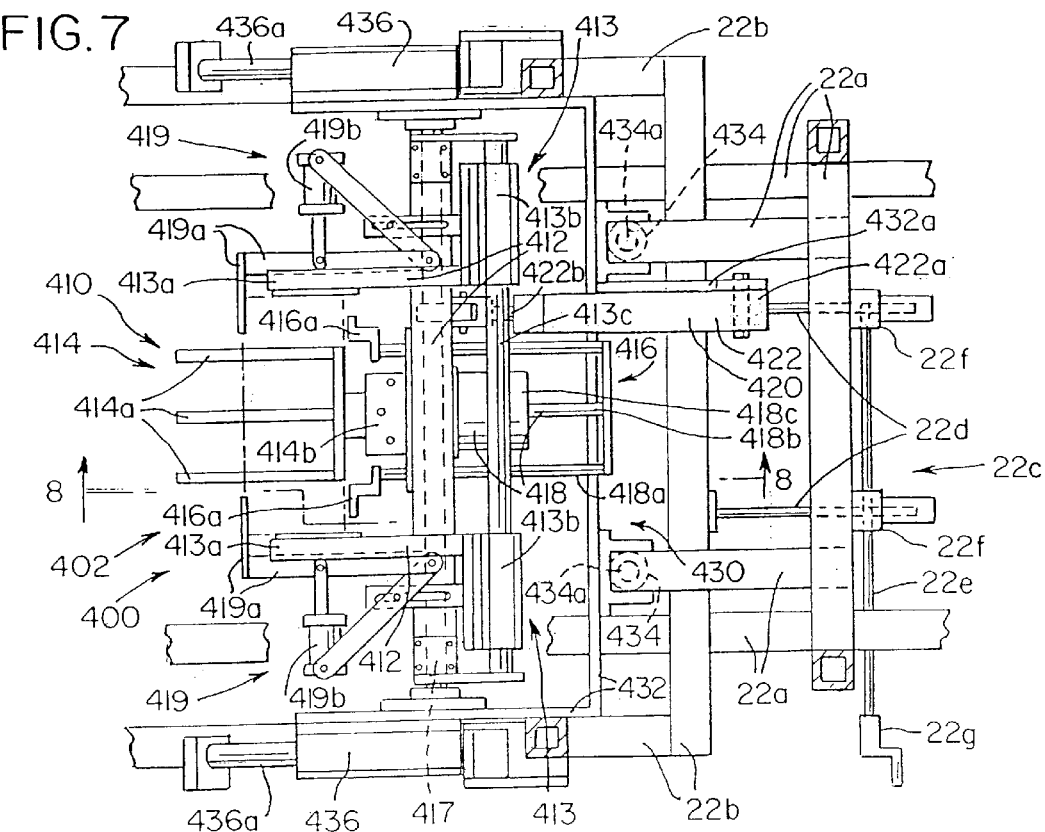
FIG. 7 is a top view of the slug forming station of the apparatus illustrated in FIGS. 1A and 1B.
Figure 8:
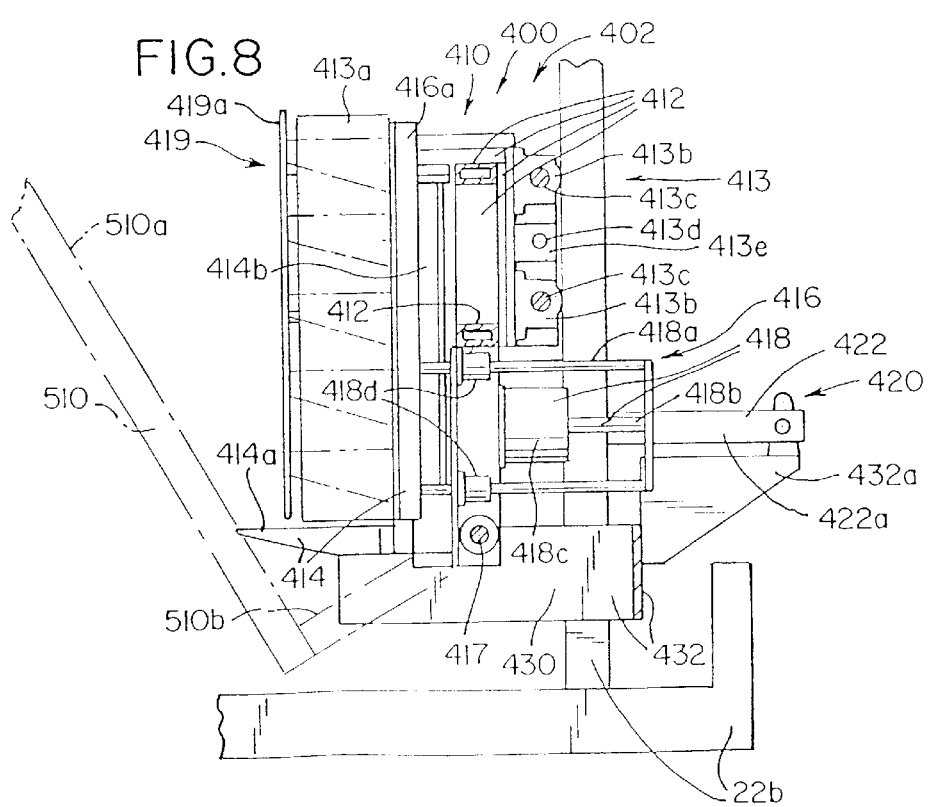
FIG. 8 is a view taken along view line 8—8 in FIG. 7.

The slug forming station 400 comprises a tilt hopper device 402 which receives the double stacks from the fourth bin 350, see FIGS. 7 and 8. The tilt hopper device 402 comprises the pivotable slug bin 410 which receives the double stacks from the fourth bin 350 and a tilting device 420 coupled to the slug bin 410 for pivoting the slug bin 410 once a slug 102 of cartons 100 has been formed in the bin 410.

The slug bin 410 comprises a slug frame 412 and an elevator device 414. The frame 412 includes a rotatable shaft 417 mounted in bearings and is pivotable via the tilting device 420. The slug frame 412 further includes two movable side wall assemblies 413, see FIGS. 7 and 8. Each assembly 413 comprises a side wall 413a coupled to two linear bearings 413b which, in turn are movable along two shafts 413c. A screw 413d having first and second oppositely threaded sections extends through portions 413e of the side walls 413a. The spacing between the side wall assemblies 413 can be adjusted via rotation of the screw 413d using, for example, a crank (not shown).

The elevator device 414 comprises a movable platform 414a which defines a floor of the slug bin 410, see FIGS. 7 and 8. The elevator device 414 further includes a hydraulic rodless cylinder 414b which is coupled to the slug frame 412 and to the movable platform 414a. The cylinder 414b effects reciprocating movement of the movable platform 414a toward and away from the fourth bin 350. Operation of the cylinder 414b is controlled via the controller 15, a solenoid and a control valve.

The slug bin 410 further comprises a pusher device 416 coupled to the slug frame 412. The device 416 comprises two reciprocating rams 416a which define a back wall of the slug bin 410 when positioned in a home position, see FIG. 7. The rams 416a push a slug 102 of folded cartons 100 out from the slug bin 410 and into a slug receiving basket 510, shown in phantom in FIG. 8, when moved to their extended position. A pneumatic piston/cylinder unit 418 and a frame 418a coupled to the unit 418 are provided for effecting back and forth movement of the rams 416a. The unit 418 includes a piston 418b connected to the frame 418a and a cylinder 418c connected to the slug frame 412. The frame 418a extends through bearings 418d which are also connected to the slug frame 412. Reciprocating movement of the piston 418b and, hence, the frame 418a effects back and forth movement of the rams 416a. The operation of the unit 418 is controlled via the controller 15, a solenoid and a control valve.

Two conventional sensors (not shown) such as proximity sensors are coupled to the frame 412 and sense portions of the frame 418a when it is extended or retracted. Signals from the sensors are provided to the controller 15.

The slug bin 410 also comprises first and second door assemblies 419 coupled to the two side wall assemblies 413. Each assembly 419 has a pivotable door 419a and a piston/cylinder device 419b for effecting pivotable movement of the door 419a between closed and open positions. The doors 419a define a front wall of the slug bin 410 when positioned in their closed position, see FIG. 7. The doors 419a, when opened via the units 419b, allow a slug 102 of folded cartons 100 to be move out of the slug bin 410 and into the slug receiving basket 510 via the rams 416a. The piston/cylinder devices 419b are pneumatic and controlled via the controller 15, a solenoid and a control valve.

For each door assembly 419, two conventional sensors (not shown) such as proximity sensors are provided to sense the open and closed positions of the door 419a. Signals from the sensors are provided to the controller 15.

The support structure 20 comprises a stationary section 22a (shown in FIG. 7 but not in FIG. 8) and a movable section 22b. The first bin 50 is mounted to the stationary section 22a while the second, third and fourth bins 150, 250 and 350 are mounted to the movable section 22b. A support structure displacement device 22c (shown in FIG. 7 but not in FIG. 8) is provided for effecting movement of the movable support section 22b relative to the stationary support section 22a. The device 22c comprises first screws 22d which are coupled to the movable section 22b such that axial movement of the screws 22d effects movement of the section 22b relative to the stationary section 22a. The first screws 22d pass through bores in the stationary section 22a and are threadedly received in jack screws 22f, which are coupled to the stationary section 22a. A second screw 22e passes through the jack screws 22f and, upon being rotated via a crank 22g, effects rotation of the first screws 22d. Rotation of the first screws 22d in turn effects linear movement of the movable section 22b relative to the stationary section 22a.

The tilt hopper 402 device further comprises a floating frame 430. The floating frame 430 includes a movable frame structure 432 and two first linear bearings 434 and two second linear bearings 436, see FIGS. 1B and 8. The frame structure 432 is fixedly mounted to the linear bearings 434 and 436. The slug bin 410 and the tilting device 420 are mounted to the floating frame 430 so as to move with the frame 430. The first linear bearings 434 are movable along two generally vertical first shafts 434a, each of which is fixedly secured to the stationary support section 22a. The second linear bearings 436 are movable along two second shafts 436a, each of which is fixedly secured to the movable support section 22b. Each of the second shafts 436a extends from horizontal at an angle of from about 10° to about 85° and, preferably, about 30°.

The tilting device 420 comprises a hydraulic piston/cylinder unit 422. The cylinder 422a is coupled to an extension 432a of the frame structure 432. The piston 422b is coupled to the slug frame 412. Movement of the piston 422b effects pivotable movement of the slug bin 410 between tilt and home positions. The operation of the unit 422 is controlled via the controller 15, a solenoid and a control valve.

Two conventional sensors (not shown) such as proximity sensors are provided on the frame 430 and sense flags (not shown) mounted on the shaft 417 so as to sense home and tilt positions of the slug bin 410. Signals from the sensors are provided to the controller 15.

When the slug frame 412 and the elevator device 414 receive the first double stack of folded cartons 100, the elevator device 414 is in its filly elevated position. A photosensor or like sensor (not shown) is positioned near an upper section of the slug frame 412 so as to sense cartons in the slug frame 412. After receiving the first double stack, the controller 15 indexes the movable platform 414a down until the top edge of the first double stack is below the level of the photosensor. Thus, the slug bin 410 is ready to receive the next double stack. This process is repeated until the full count desired to build a slug 102 is deposited in the slug bin 410.

By interposing the third and fourth bins 250 and 350 between the second bin 150 and the slug bin 410 and by using a movable platform 414a as the bottom of the slug bin 410, as described above, the distance any given double stack of cartons drops between bins is limited. By limiting the distance each double stack drops between bins, the likelihood is reduced that one or more folded cartons 100 in each stack 110 will move, causing a stack 110 to lose its square or a jam in the process. For the above exemplary folded carton 100, satisfactory results have been obtained when each double stack drops about 7 inches or less between each bin. While four bins 50, 150, 250 and 350 are provided in the illustrated embodiment, the number of bins may vary.

Once a slug 102 of the desired number of folded cartons 100 is formed, the slug bin 410 is tilted to the left, as viewed in FIG. 1B, about 30° from vertical via the tilting device 420. Before the slug bin 410 is tilted, the slug receiving basket 510 is moved into position to receive the slug 102 by actuating a hydraulic piston/cylinder assembly 520, see FIG. 9. In the illustrated embodiment, the basket 510 is tilted clockwise 60° from horizontal before it is moved into position to receive the slug 102 by the assembly 520, see FIG. 1B. Once the slug bin 410 is tilted, the doors 419a on the left side of the slug bin 410, as viewed in FIGS. 7 and 8, open to allow the slug 102 to be removed. The rains 416a are then moved outwardly via the piston/cylinder unit 418 and the frame 418a to push the slug 102 into the slug basket 510. While in the basket 510, a side of the slug 102 rests on the bottom 510a of the slug basket 510 and the top and bottom of the slug 102 each face one of the sides 510b of the slug basket 510. The slug basket 510 is then tilted from its 60° angle to horizontal, removing the slug 102 from the tilted slug bin 410. When the slug 102 is in this horizontal orientation, the plane formed by each folded carton 100 is vertical. As the slug basket 510 tilts to horizontal, the slug bin 410 is rotated back to its home position via the unit 422. Thereafter, the doors 419a close and the rams 416a are returned to their home or retracted position.

Figure 9:
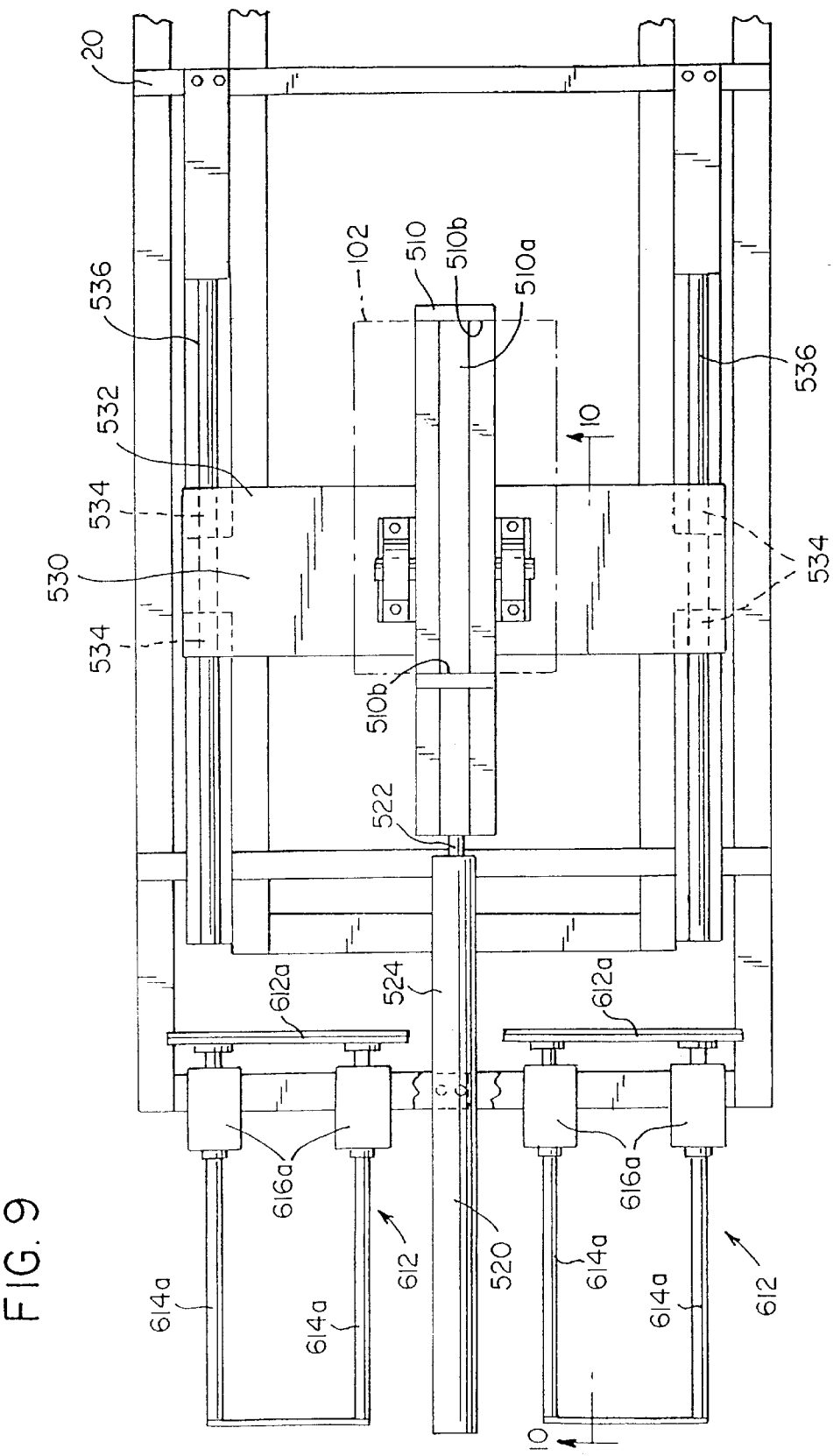
FIG. 9 is a top view of a slug receiving basket and the reciprocating carriage to which it is mounted.

The slug receiving basket 510 is mounted on a reciprocating carriage 530, see FIGS. 9 and 10. The carriage 530 comprises a carriage frame 532 and carriage linear bearings 534 which are fixedly coupled to the frame 532, see FIGS. 9 and 10. The linear bearings 534 move along rails or shafts 536 which are fixedly coupled to the support structure 20. The hydraulic piston/cylinder assembly 520 includes a piston 522 and a cylinder 524. The cylinder 524 is mounted to the support structure 20 and the piston 522 is coupled to the carriage 530. Back and forth movement of the piston 522 effects back and forth movement of the carriage 530 along the rails 536. The operation of the assembly 520 is controlled via the controller 15, a solenoid and a control valve.

Conventional sensors (not shown) such as proximity sensors are mounted on the support structure 20 to sense the position of the carriage 530. One sensor is mounted adjacent to the cylinder 524 so as to sense the carriage 530 when it is positioned in a slug unload position, i.e., when the piston 522 is fully retracted into the cylinder 524. The other sensor is also mounted to the support structure 20 and is positioned such that it senses the carriage 530 when the carriage 530 is in its slug receiving position, as shown in FIG. 1B. Signals from the sensors are provided to the controller 15.

A hydraulic piston/cylinder assembly 540 is provided comprising a piston 542 mounted to the basket 510 via an arm 511 and a cylinder 544 mounted to the frame 532, see FIG. 10. Back and forth movement of the piston 542 effects pivotable movement of the basket 510 which is fixedly mounted to a pivotable shaft 550. The shaft 550 is pivotably mounted to the frame 532. The operation of the assembly 540 is controlled via the controller 15, a solenoid and a control valve.

Two conventional sensors (not shown) such as proximity sensors are provided on the frame 532 and sense a flag (not shown) mounted on the shaft 550 so as to sense slug receiving (i.e., tilted) and horizontal positions of the basket 510. Signals from the sensors are provided to the controller 15.

Figure 15:
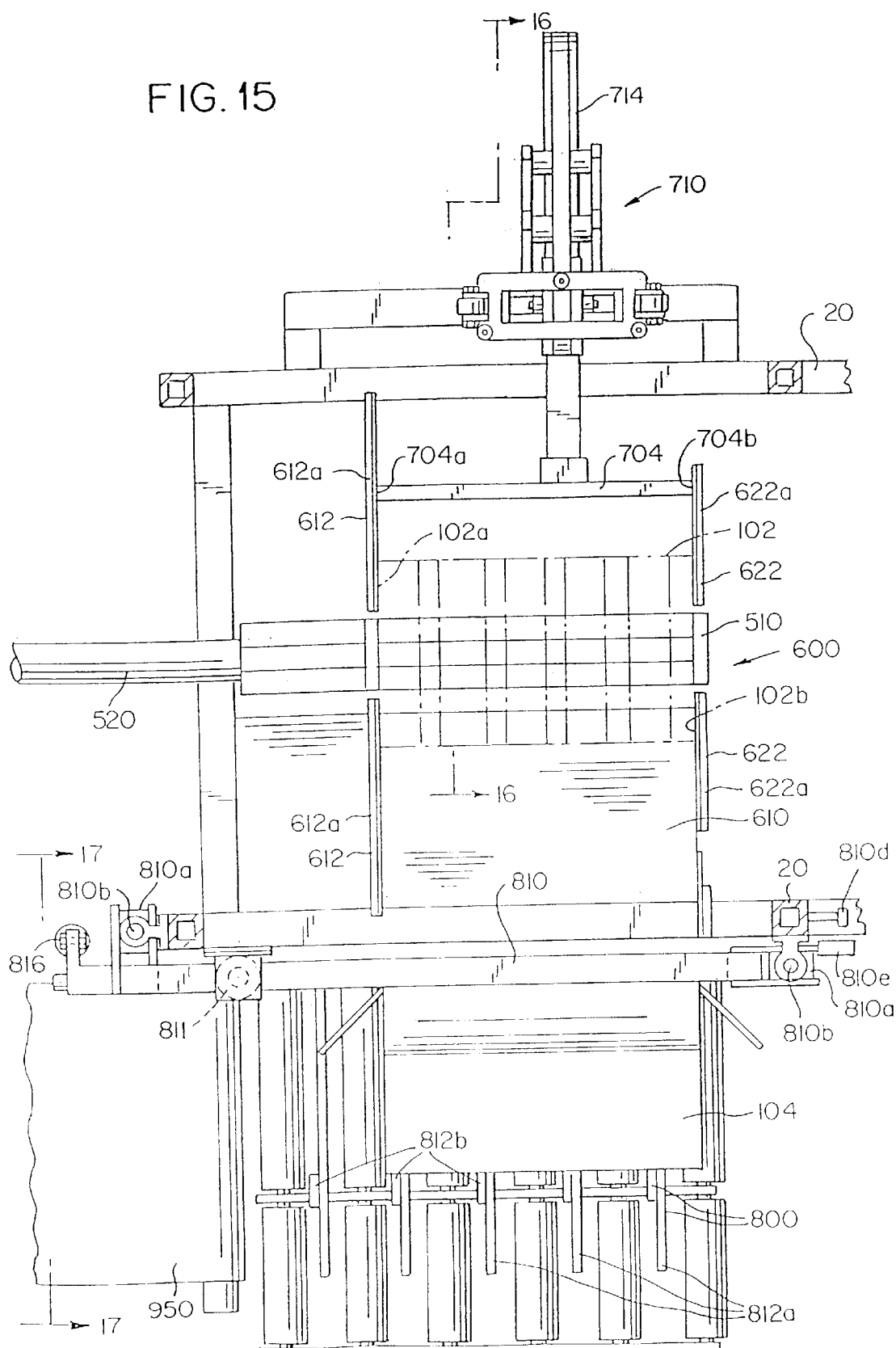
FIG. 15 is a plan view of the slug unload station.

As noted above, when the piston 522 is fully retracted into the cylinder 524, the carriage 530 is positioned in its slug unload position, see FIG. 15. When the slug basket 510 is horizontally positioned and the carriage 530 is located in its slug unload position, the slug 102 of cartons 100 is partially located on a pusher table 610 in a slug unload station 600, see also FIG. 16.

When the slug 102 is located on the pusher table 610, a first end 102a of the slug 102 abuts two first side guides 612, see FIG. 15. Each first side guide 612 comprises a first plate 612a, two first shafts 614a (not shown in FIG. 15 ) and two linear bearings 616a (not shown in FIG. 15) which receive the shafts 614a, see also FIGS. 9 and 10. The shafts 614a are movable within the linear bearings 616a so as to allow the plates 612a to be moved to a desired position. Once the plates 612a are properly positioned, the shafts 614a are releasably locked in place bu locking clamps bolted to the bearings 616a. As will be discussed further below, each plate 612a has a guide slot 612b, see FIGS. 1B and 10, which receives a tab on a first outer edge 704a of a slug pusher bar 704.

Figure 16:
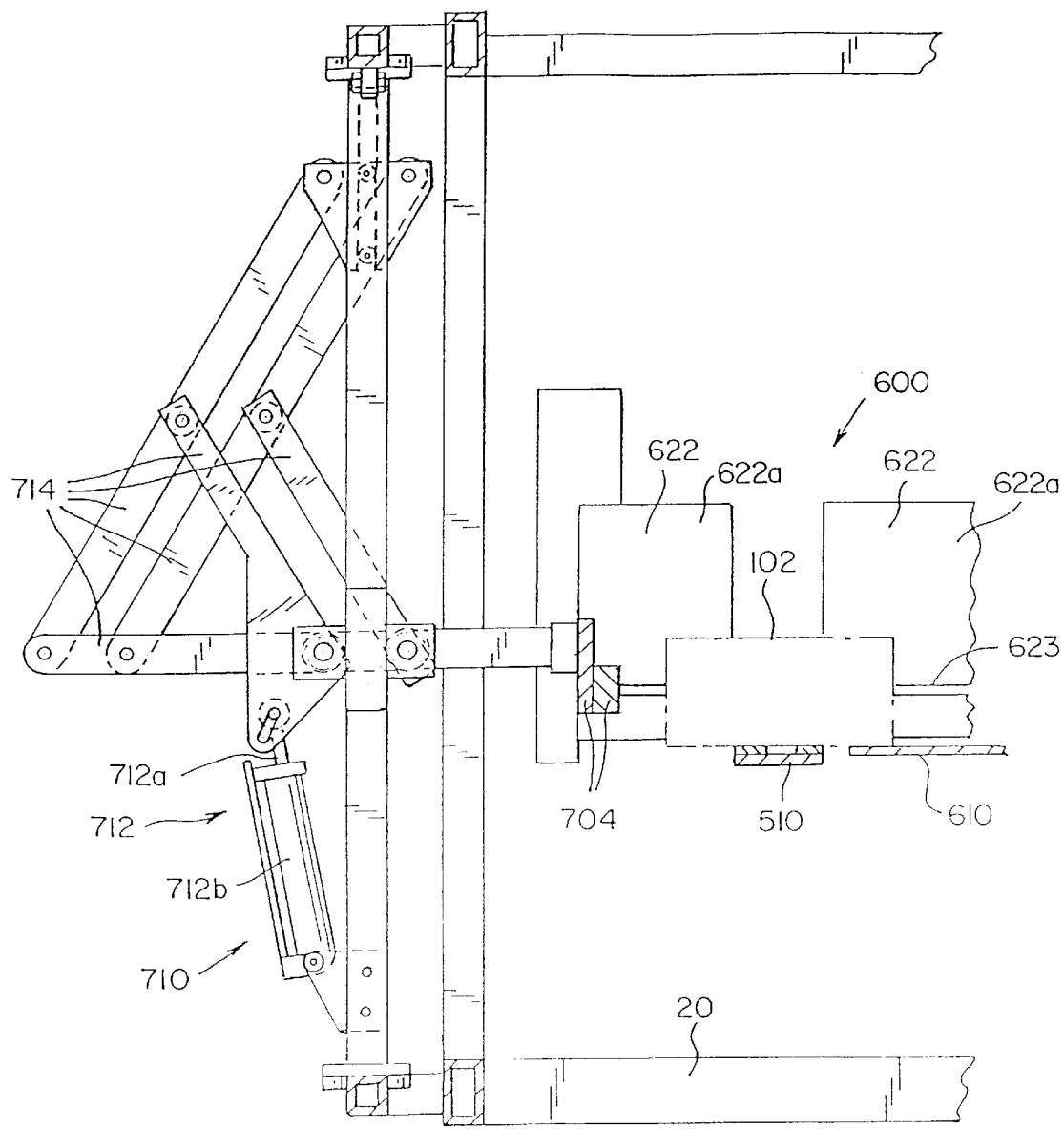
FIG. 16 is a view taken along view line 16—16 in FIG. 15.

A second end 102b of the slug 102 abuts two second side guides 622 when the slug 102 is located on the pusher table 610, see FIGS. 15 and 16. Each second guide 622 comprises a second plate 622a fixedly mounted to two shafts 622b which, in turn, are rotatably mounted to the support structure 20 by bearings or the like, see FIGS. 11 and 12. An arm 622c is fixedly mounted to one of the shafts 622b such that movement of the arm 622c effects pivotable movement of the plate 622a between opened and closed positions. When the second plates 622a are open, the slug basket 510 is permitted to be moved from its slug receiving position, shown in FIG. 1B, to its slug unload position, shown in FIG. 15. Each plate 622a has a guide slot 623 which receives a tab on a second outer edge 704b of the slug pusher bar 704, as will be discussed further below. The second plates 622a are not illustrated in FIG. 9.

A second side guide piston/cylinder assembly 630 is provided to effect pivotable movement of the two second plates 622a, see FIGS. 11 and 12. The assembly 630 comprises a piston/cylinder unit 632 having a piston 632a which is fixedly coupled to a movable bar 634. Two guide shafts 636 movable within two linear bearings 638 are also fixedly coupled to the bar 634. Two links 639 extend between and are coupled to opposing ends of the bar 634 and the arms 622c. Thus, back and forth movement of the piston 632a effects pivotable movement of the second plates 622a. The assembly 630 is not illustrated in FIGS. 9, 15 and 16.

A conventional sensor 640 such as a proximity sensor is mounted on the support structure 20 and senses a flag 642 mounted on one of the shafts 636, see FIG. 12, so as to sense when the plates 622a have been moved to their open position. Signals from the sensor 640 are provided to the controller 15.

Once the slug 102 has been moved into the slug unload station 600, see FIG. 15, the second guide plates 622a are closed via the assembly 630. The slug pusher bar 704 is then extended so as to move the now supine slug 102 of cartons 110 into a shipping container 104, such as a corrugated cardboard box, see FIG. 18. The slug pusher bar 704 is then returned to its home position and the basket 510 is moved from its horizontal position to its tilted, slug receiving position, i.e., is moved 60° from horizontal.

The slug pusher bar 704 is dimensioned to fit between the first and second plates 612a and 622a. To help ensure that no folded carton 100 slips between the slug pusher bar 704 and one of the plates 612a and 622a, the opposing ends 704a and 704b of the slug pusher bar 704 include a tab which fits into and slides along the guide slots 612b and 623 in the plates 612a and 622a, see FIG. 1B.

A slug pusher bar piston/cylinder assembly 710 is provided to effect reciprocating movement of the slug pusher bar 704, see FIGS. 15 and 16. The assembly 710 comprises a hydraulic piston/cylinder unit 712 having a piston 712a which is fixedly coupled to a linkage assembly 714 which in turn is fixedly coupled to the slug pusher bar 704. The linkage assembly 714 may comprise any type of linkage arrangement which is capable of transferring reciprocating movement of the piston 712a into back and forth movement of the slug pusher bar 704 within a generally horizontal plane. Thus, reciprocating movement of the piston 712a effects back and forth movement of the slug pusher bar 704.

Two conventional sensors (not shown) such as proximity sensors are provided on the support structure 20 and sense flags (not shown) mounted on the linkage assembly 714 so as to sense extended and retracted positions of the slug pusher bar 704. Signals from the sensors are provided to the controller 15.

The apparatus 10 can be adjusted to accommodate cartons having varying widths W. First, the distance between the slug receiving basket 510, when it is positioned as shown in FIG. 1B, and the slug bin 410, when it is tilted, is changed. This is effected by moving the movable section 22b relative to the stationary section 22a. As the movable section 22b moves, the slug receiving basket 510 moves relative to the slug bin 410 and the stationary section 22a. Further, the floating frame 430 and, hence, the slug bin 410 move vertically relative to the basket 510. The location of the movable section 22b relative to the section 22a is adjusted until: 1) the distance between the tilted basket 510 and the tiled slug bin 410 is equal to or greater than the carton width W, and 2) the side 510b of the basket 510 closest to the slug bin 410 lines up with the upper surface of the movable platform 414a when the slug bin 410 is tilted 30° and the basket is rotated 60°. The location of the back plate 55 is also adjusted by changing the positions of the stops 20b and 20c. The front and rear walls 157a and 157b of the second bin 150, the front and rear walls of the third bin 250 and the front and rear walls of the fourth bin 350 are also adjusted to accommodate the changed carton width W.

Figure 17:
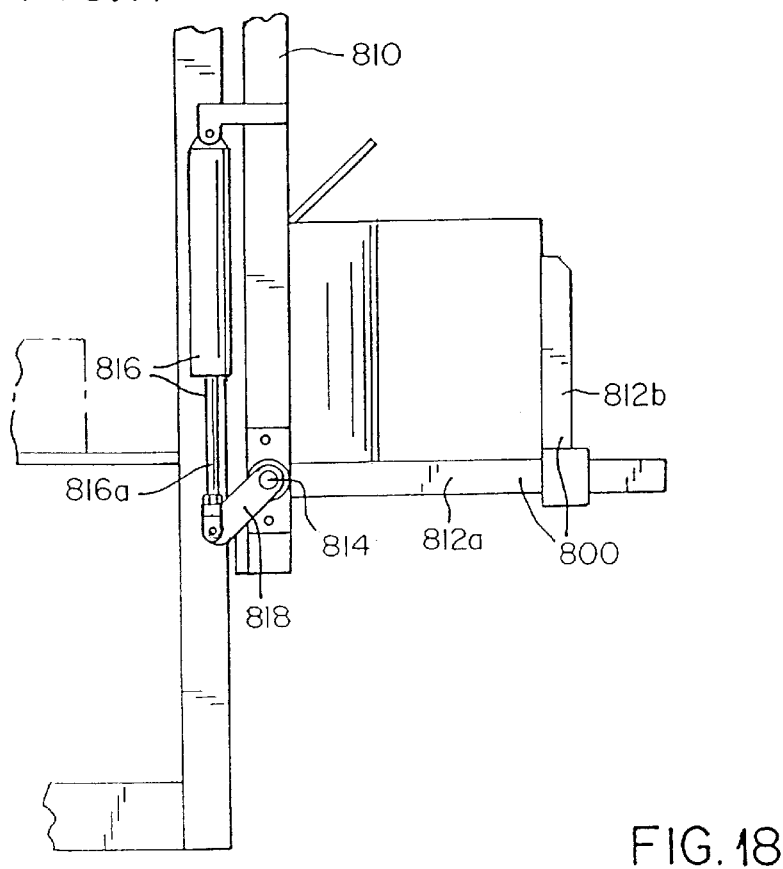
FIG. 17 is a view taken along view line 17—17 in FIG. 15.

To allow the shipping box 104 to receive one or more slugs 102 of folded cartons 100, the shipping box 104 is positioned on a case rack 800 adjacent to the slug unload station 600, see FIGS. 15 and 17. The case rack 800 is pivotably mounted to a case rack frame 810, see also FIG. 1B. The case rack 800 comprises a plurality of first arms 812a mounted to a pivotable shaft 814 which in turn is mounted to the frame 810. The rack 800 further includes second arms 812b which are mounted to the first arms 812a. A piston cylinder unit 816 is provided for effecting pivotable movement of the arms 812a and 812b between box supporting and box discharge positions. The unit 816 includes a piston 816a pivotably coupled to a case rack arm 818 which in turn is fixedly mounted to the shaft 814, see FIG. 17. Pivotable movement of the arm 818 via the piston 816a effects rotary movement of the shaft 814. Thus, when the piston 816a is extended, the arms 812a and 812b are in their box supporting position, see FIGS. 15 and 17. When so positioned, the arms 812a and 812b maintain a box 102 adjacent to the slug unload station 600 so as to allow the box 102 to receive one or more slugs 102 of cartons 100. When the piston 816a is retracted, the arms 812a and 812b are in their discharge position, see FIG. 1B, such that the box 104 is discharged onto a lift table assembly 900, which will be described below.

A case guide 820 is mounted to the frame 810 and is engaged by the shipping box 104 when the box 104 is mounted in the case rack 800 and the latter is in its box supporting position. The case guide 820 serves to align and support the box 104 when it is in its slug receiving position.

It is desirable for the shipping box 104 to be capable of containing two, or even more, of the slugs 102. Once one slug 102 is stuffed or moved into the shipping box 104, the case rack frame 810 drops down. The frame 810 includes four linear bearings 810a which move along shafts 810b coupled to the support structure 20. Vertical movement of the frame 810 along the shafts 810b is effected via a piston/cylinder unit 811. The operation of the unit 811 is controlled by the controller 15. As noted above, the pivotable shaft 814 is mounted to the frame 810. Thus, the first and second rack arms 812a and 812b together with the shipping box 104 move with the frame 810. The frame 810 is dropped via the piston/cylinder unit 811 from a first load position to a second load position so that the slug 102 that was just stuffed into the box 104 is below the level of the next slug 104 to be stuffed. The next slug 102 is formed and maneuvered into position to be stuffed as described above with regard to the first slug 102.

Two conventional sensors 810d such as proximity sensors are mounted on the support structure 20 and sense a flag 810e mounted to the frame 810 so as to sense when the frame 810 is in its first or second load position, see FIGS. 1B and 15. Signals from the sensors 810d are provided to the controller 15.

To facilitate stuffing the next slug 102 into the shipping box 104, a sheet inserter 850 is moved into the shipping box 104, above the slug 102 that was just stuffed. The sheet inserter 850 can be made of plastic, metal or any other suitable material and is sized to accommodate the size of the shipping container 104 being stuffed. The inserter 850 is moved between inserted and retracted positions via an inserter piston/cylinder unit 860, see FIGS. 13 and 14. The unit 860 includes a piston 860a which is connected to an inserter arm 852. The arm 852 is fixedly coupled to a shaft 852a which in turn is fixedly coupled to the inserter 850. Retraction of the piston 860a effects movement of the inserter 850 to its inserted position. When so positioned, the inserter 850 passes through the case guide 820 and into the box 104. Extension of the piston 860a effects movement of the inserter 850 to its retracted position, see FIGS. 13 and 14.

Two conventional sensors 855, see FIGS. 13 and 14, such as proximity sensors are mounted to the support structure 20 and sense the inserter 850 when it is in one of its inserted and retracted positions. Signals from the sensors 855 are provided to the controller 15.

Once the inserter 850 has been moved to its inserted position, the next slug 102 is pushed into the shipping box 104. The sheet inserter 850 helps to prevent individual folded cartons 100 from any slug 102 subsequently stuffed into the same shipping container 104 from falling down between folded cartons in or otherwise getting hung-up by the previously stuffed slug 102. If more than two slugs are stuffed into the same shipping container, the preceding process is repeated until the shipping container is full.

The unit 816 then causes the rack arms 812a and 812b to move to their discharge position such that the box 104 is pivoted downward and deposited onto the lift table assembly 900. The lift table assembly 900 comprises a pivotable lift table 910 and a piston/cylinder unit 920 for effecting pivotable movement of the lift table 910. The operation of the unit 920 is controlled by the controller 15. Once the box 104 is positioned on the lift table 910, the unit 920 effects upward movement of the table 910 so as to deposit the box 104 onto a discharge conveyor 950. The assembly 900 and the conveyor 950 are not shown in FIG. 17. The shipping container 104 is then sealed and processed for shipping.

What is claimed is:

1. An apparatus for stacking substantially flat folded cartons into a slug of cartons comprising:

a support structure;

a conveyor apparatus supported by said support structure for delivering a stream of folded cartons to a stack building station;

stack firming apparatus supported by said support structure and positioned in said stack building station for receiving said folded cartons from said conveyor apparatus and forming one or more stacks of folded cartons and delivering said one or more stacks to a slug forming station;

a tilt hopper device positioned in said slug forming station for receiving said one or more stacks from said stack forming apparatus and forming a slug of folded cartons from said one or more stacks of folded cartons, said tilt hopper device comprising a pivotable slug bin which receives said one or more stacks from said stack forming apparatus and a tilting device coupled to said slug bin for pivoting said slug bin once said one or more stacks have been delivered to said slug bin;

slug receiving apparatus positioned adjacent to said slug forming station for receiving said slug of folded cartons from said slug bin after said slug bin has been pivoted by said tilting device; and wherein said slug bin comprises a slug frame which defines side walls of said slug bin and an elevator device comprising a movable platform which defines a floor of said slug bin.

2. An apparatus as set forth in claim 1, wherein said elevator device further comprises a rodless cylinder which is coupled to said movable platform for effecting reciprocating movement of said movable platform.

3. An apparatus as set forth in claim 1, wherein said slug bin further comprises a pusher device associated with said slug frame and comprising at least one ram which defines a back wall of said slug bin when positioned in a home position, said ram pushing said slug of folded cartons out from said slug bin and into said slug receiving basket when moved to an extended position.

4. An apparatus as set forth in claim 3, wherein said slug bin further comprises:

a first door assembly associated with said slug frame and having a first pivotable door and a first piston/cylinder device for effecting pivotable movement of said first door between closed and open positions; and a second door assembly associated with said slug frame and having a second pivotable door and a second piston/cylinder device for effecting pivotable movement of said second door between closed and open positions, said doors defining a front wall of said slug bin when said doors are positioned in their closed positions.

5. An apparatus for stacking substantially flat folded cartons into a slug of cartons comprising:

a support structure;

a conveyor apparatus supported by said support structure for delivering a stream of folded cartons to a stack building station;

stack forming apparatus supported by said support structure and positioned in said stack building station for receiving said folded cartons from said conveyor apparatus and forming one or more stacks of folded cartons and delivering said one or more stacks to a slug forming station;

a tilt hopper device positioned in said slug forming station for receiving said one or more stacks from said stack forming apparatus and forming a slug of folded cartons from said one or more stacks of folded cartons, said tilt hopper device comprising a pivotable slug bin which receives said one or more stacks from said stack forming apparatus and a tilting device coupled to said slug bin for pivoting said slug bin once said one or more stacks have been delivered to said slug bin;

slug receiving apparatus positioned adjacent to said slug forming station for receiving said slug of folded cartons from said slug bin after said slug bin has been pivoted by said tilting device;

wherein said tilt hopper device further comprises a floating frame for supporting said slug bin and said tilting device;

wherein said support structure comprises a stationary support section and a movable support section; and wherein said floating frame comprises:
a movable frame structure fixedly secured to at least one first linear bearing and at least on second linear bearing, said first linear bearing being movable along a first generally vertical shaft fixedly secured to said stationary support section and said second linear bearing being movable along a second shaft fixedly secured to said movable support section, said second shaft extending at an angle which is from about 10° to about 85° from horizontal such that movement of said movable support section effects vertical movement of said movable frame structure.

6. An apparatus for stacking substantially flat folded cartons into a slug of cartons comprising:

a support structure;

a conveyor apparatus supported by said support structure for delivering a stream of folded cartons to a stack building station;

stack forming apparatus supported by said support structure and positioned in said stack building station for receiving said folded cartons from said conveyor apparatus and forming one or more stacks of folded cartons and delivering said one or more stacks to a slug forming station:

a tilt hopper device positioned in said slug forming station for receiving said one or more stacks from said stack forming apparatus and forming a slug of folded cartons from said one or more stacks of folded cartons, said tilt hopper device comprising a pivotable slug bin which receives said one or more stacks from said stack forming apparatus and a tilting device coupled to said slug bin for pivoting said slug bin once said one or more stacks have been delivered to said slug bin;

slug receiving apparatus positioned adjacent to said slug forming station for receiving said slug of folded cartons from said slug bin after said slug bin has been pivoted by said tilting device;

wherein said tilt hopper device further comprises a floating frame for supporting said slug bin and said tilting device;

wherein said support structure comprises a stationary support section and a movable support section; and a support structure displacement device for effecting movement of said movable support section relative to said stationary support section.

7. An apparatus for stacking substantially flat folded cartons of non-uniform thickness comprising:

a support structure;

conveyor apparatus supported by said support structure for delivering a stream of folded cartons to a stack building station;

a first stack building hopper positioned in said stack building station for receiving said folded cartons from said conveyor apparatus and forming at least two stacks of folded cartons;

a stack rotating hopper positioned in said stack building station for receiving said two stacks of folded cartons from said first hopper and forming a double stack of folded cartons, said stack rotating hopper rotating one of said two stacks approximately 180° before receiving the other of said two stacks such that said double stack has top and bottom cartons which are substantially parallel to one another;

at least one second stack building hopper positioned in said stack building station below said stack rotating hopper for receiving said double stack from said stack rotating hopper; and wherein said at least one second stack building hopper comprises two second stack building hoppers.

* * * * *